INVENTORS.
DONN J. RICKARD
FRANKLIN K. HOLBROOK
RONALD C. BUSHMAN
WARREN O. PRESTON
THOMAS H. GILL
BY Paul A. Weilein
ATTORNEY

CITRUS FRUIT JUICING MACHINERY

INVENTORS
DONN J. RICKARD
FRANKLIN K. HOLBROOK
RONALD C. BUSHMAN
WARREN O. PRESTON
THOMAS H. GILL

BY Paul A. Weilein
ATTORNEY

CITRUS FRUIT JUICING MACHINERY

INVENTORS.
DONN J. RICKARD
FRANKLIN K. HOLBROOK
RONALD C. BUSHMAN
WARREN O. PRESTON
THOMAS H. GILL

BY Paul A. Weilein
ATTORNEY

June 10, 1969 D. J. RICKARD ET AL 3,448,682

CITRUS FRUIT JUICING MACHINERY

Filed March 13, 1967 Sheet 4 of 14

INVENTORS.
DONN J. RICKARD
FRANKLIN K. HOLBROOK
RONALD C. BUSHMAN
WARREN O. PRESTON
THOMAS H. GILL

BY Paul A. Weilein
ATTORNEY

INVENTORS.
DONN J. RICKARD
FRANKLIN K. HOLBROOK
RONALD C. BUSHMAN
WARREN O. PRESTON
THOMAS H. GILL
BY Paul A. Weilein
ATTORNEY INVENTORS.
DONN J. RICKARD
FRANKLIN K. HOLBROOK
RONALD C. BUSHMAN
WARREN O. PRESTON
THOMAS H. GILL BY Paul A. Weilein
ATTORNEY

CITRUS FRUIT JUICING MACHINERY

Filed March 13, 1967

INVENTORS
DONN J. RICKARD
FRANKLIN K. HOLBROOK
RONALD C. BUSHMAN
WARREN O. PRESTON
THOMAS H. GILL

BY Paul A. Weilein
ATTORNEY

INVENTORS.
DONN J. RICKARD
FRANKLIN K. HOLBROOK
RONALD C. BUSHMAN
WARREN O. PRESTON
THOMAS H. GILL

BY Paul A. Weilein
ATTORNEY

INVENTORS.
DONN J. RICKARD
FRANKLIN K. HOLBROOK
RONALD C. BUSHMAN
WARREN O. PRESTON
THOMAS H. GILL

BY Paul A. Weilein
ATTORNEY

INVENTORS.
DONN J. RICKARD
FRANKLIN K. HOLBROOK
RONALD C. BUSHMAN
WARREN O. PRESTON
THOMAS H. GILL

BY Paul A. Weilein
ATTORNEY

INVENTORS.
DONN J. RICKARD
FRANKLIN K. HOLBROOK
RONALD C. BUSHMAN
WARREN O. PRESTON
THOMAS H. GILL
BY Paul A. Weilein
ATTORNEY INVENTORS.
DONN J. RICKARD
FRANKLIN K. HOLBROOK
RONALD C. BUSHMAN
WARREN O. PRESTON
THOMAS H. GILL
BY Paul A. Weilein
ATTORNEY INVENTORS.
DONN J. RICKARD
FRANKLIN K. HOLBROOK
RONALD C. BUSHMAN
WARREN O. PRESTON
THOMAS H. GILL
BY Paul A. Weilein
ATTORNEY INVENTORS.
DONN J. RICKARD
FRANKLIN K. HOLBROOK
RONALD C. BUSHMAN
WARREN O. PRESTON
THOMAS H. GILL BY Paul A. Weilein
ATTORNEY 3,448,682
CITRUS FRUIT JUICING MACHINERY Donn J. Rickard, Glendora, Franklin K. Holbrook, Whittier, Ronald C. Bushman, Claremont, Warren O. Preston, Fullerton, and Thomas H. Gill, Alhambra, Calif., assignors to Brown International Corporation, Covina, Calif., a corporation of California Filed Mar. 13, 1967, Ser. No. 622,702
Int. Cl. B67b *3/26;* B30b *15/08, 9/06*
U.S. Cl. 100—53 46 Claims

ABSTRACT OF THE DISCLOSURE

An apparatus for expressing juice from citrus fruit by cyclically operating an individual fruit feed conveyor, a transfer device which moves fruit to a cutting mechanism of the type in which the whole fruit is pushed downwardly over a knife and the fruit halves delivered to a platform, a positioning mechanism which grips each fruit between fingers and indexes the fingers to move the halves onto grids, and a pressure applying mechanism of the rotary pressure head type, the apparatus being driven by cams on a pair of main shafts and by a related indexing shaft.

The present invention relates to citrus fruit juicing machinery and more particularly to a machine adapted to cut and squeeze citrus fruit in such a manner that very uniform sampling of the quality of citrus fruit may be obtained as a guide to the determination of the value of a load of the fruit, although it will be understood that where volume juice production in a short period of time is not necessary, the machine may have application to commercial production of juice. The invention involves improvements in the equipment disclosed in Foss et al. Patent No. 3,185,071, Rickard Patent No. 3,185,072, and Rickard et al. Patent No. 3,250,210.

In the citrus juice industry it is the practice to take representative samples of loads of whole citrus fruit and squeeze such samples to obtain sample juice indicative of certain qualities of the fruit of the entire load, such as the volume of the fruit juice, the soluble sugar content of the fruit juice, and other factors determinative of the economic value of a given load of fruit. It is desirable under such circumstances to be able to obtain sample juice in a uniform manner independent of variation in whole fruit size, and, moreover, it is desirable that a reasonable sample quantity of the fruit be handled to obtain the juice therefrom within a comparatively short period of time and with a minimum of manual handling.

In such operations, it is obviously necessary that the fruit be cut and that the juice be expressed from the cut fruit by the application of pressure, and the present invention contemplates a machine or apparatus whereby a substantial quantity of sample fruit may be rapidly handled and wherein the treatment of the cut fruit sections is uniform without regard to variations in fruit size and shape.

Additionally, in the operation of such citrus fruit juicing machinery, the feeding of fruit to the mechanism for cutting the same should be consistent in its operation in order to make most efficient use of the squeezing apparatus. This is to say, it is desirable that each cycle of the machine effect the cutting and squeezing of a full complement of whole fruit.

Accordingly, a general object of the present invention is to provide improved fruit feeding transferring, cutting, positioning, and squeezing or pressure applying instrumentalities whereby whole fruit are fed into the machine and are progressively transferred to a cutting means, cut, and positioned at a location at which pressure is applied to cut fruit sections, the pressed fruit sections, namely the residual peels thereof, being discharged for collection separately from the expressed juice.

More particularly, an object of the invention is to provide fruit feeding mechanism for feeding individual fruit to a pair of parallel chutes in alternate succession in such a manner as to assure that a fruit is available in each chute upon each successive operation of means in the machine for transferring a fruit from the chute to a location at which such fruit is halved for subsequent expression of the juice therefrom.

A problem encountered in the feeding of whole fruit to positions in fruit juicing machines at which the whole fruit is to be cut entails the inherent variation in size and shape of the whole fruit. In this connection, the bulk load of fruit delivered to a juicing plant will consist of fruit of a wide range of sizes varying in oranges, for example, from so-called marbles having a diameter of something less than two inches, to oranges approaching grapefruit size and having a diameter ranging up to five or six inches, for example. The present invention therefore has as a further object the provision of means for handling the fruit regardless of size and normal shape variation and individually feeding successive fruit to the cutting means even though the means for transferring such fruit may encounter first a marble size fruit and immediately thereafter a large size fruit, or vice versa.

In the operation of juice extraction apparatus of the type disclosed in the aforementioned Patent No. 3,250,-210, it has been found that periodically a fruit half gravitating onto the fruit receiving platform following halving of the fruit may either be improperly positioned with respect to the positioning means for moving the half fruit sections on the platform to a position for the application of pressure thereto, on the one hand, or, on the other hand, in some instances a large fruit half may gravitate onto the platform and find access to the spent peel discharge opening. Accordingly, another object of the invention is to provide means for directionally controlling the travel of fruit halves from the location at which the whole fruit is halved downwardly over flaring guide surfaces to the platform, including the provision of means for preventing access of large fruit to the spent peel discharge openings.

Furthermore, in the operation of the positioning means of the type incorporated in the judice extraction apparatus of said Patent No. 3,250,210, centrifugal force acting on cut fruit halves resting on the receiving platform is, in some instances, instrumental in effecting movement of the fruit halves to a position on the platform at which the fruit halves are disposed on an arcuate line substantially intersecting the axis of the pressure applying rotary heads, so that the positioning means will properly position the cut fruit halves beneath the pressure applying heads. The present invention provides means for initiating motion of one fruit half in advance of movement of the other fruit half in order to facilitate the action of the positioning means whereby the fruit halves are more effectively and uniformly moved to the above noted arcuate line. More particularly in this connection, the present invention provides positioning means including pairs of sets of positioning fingers, the fingers of each set being movable toward one another for positioning a cut fruit half on the above noted arcuate line and gripping the same during angular travel of the sets of fingers from a fruit half receiving position to a position at which pressure is to be applied to the fruit halves, and wherein one of the sets of fingers is partially closed as a preliminary to the closure of both sets of fingers of the pair, whereby the partial closing of the set of fingers initiates motion of the fruit half therebetween so that subsequent angular movement of said one set of fingers and the resultant centrifugal action on the initially moving fruit half will assure movement of the fruit half to a proper position substantially on the above noted circumferential line.

A further object of the invention is to provide control and operating means for a fruit juice extraction apparatus wherein the successive machine functions are positive in nature and are precisely timed so that they occur at the desired instant in respect of the total cycle of machine operation, thereby avoiding the necessity of employing relatively complex safety mechanisms as well as avoiding time delays and force variations inherently encountered in the use of hydraulic or hydropneumatic operating and control systems.

Still another object of the invention is to provide fruit juice extraction apparatus which is extremely rugged and durable and which will require only nominal adjustment or repair throughout its useful life.

Other objects and advantages of the invention will be hereinafter described or will become apparent to those skilled in the art, and the novel features of the invention will be defined in the appended claims.

Figure 5:
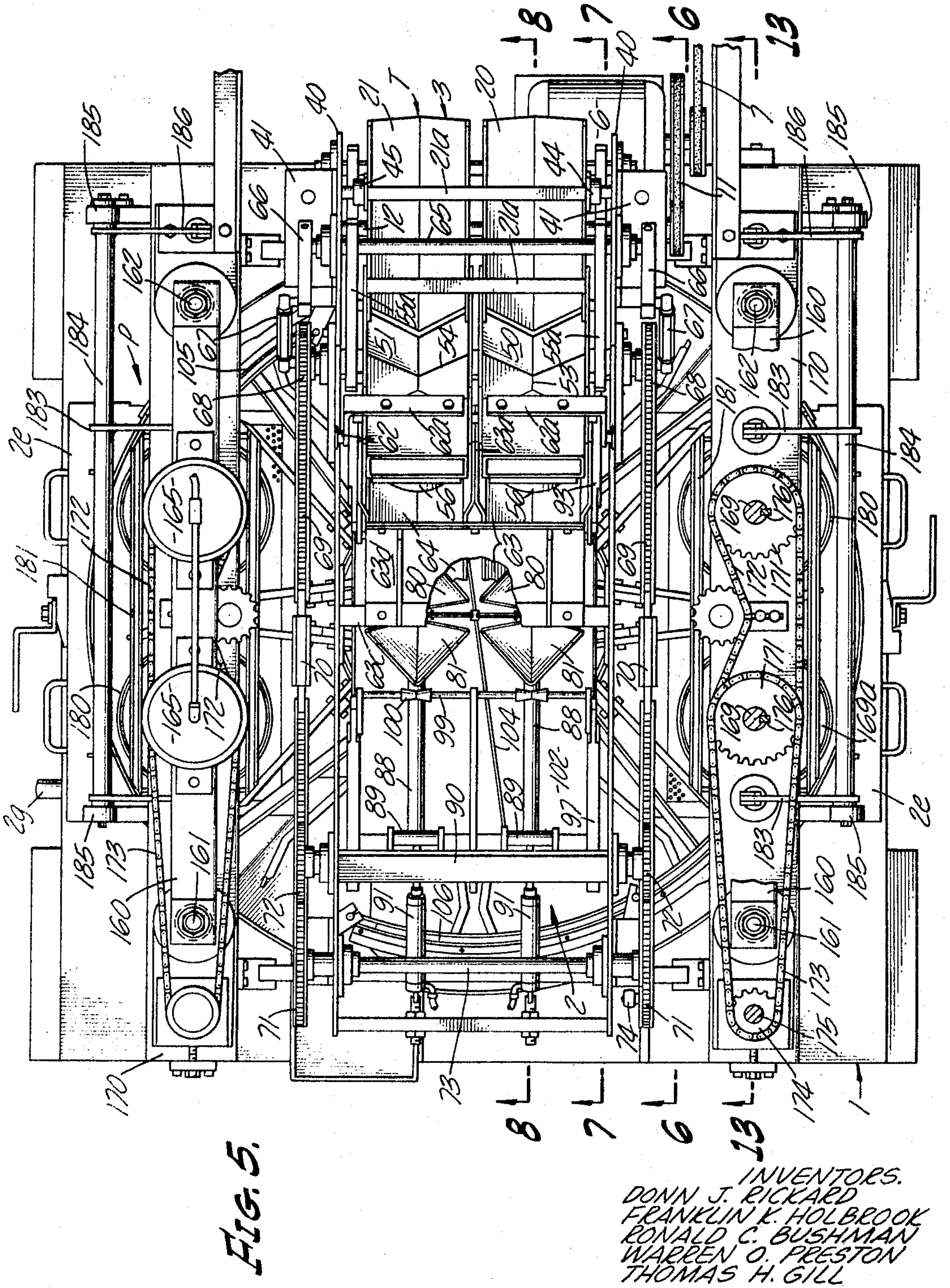
FIG. 5 is a top plan view of the fruit juicing apparatus, as embraced by the line 5—5 of FIG. 1.
Figure 6:
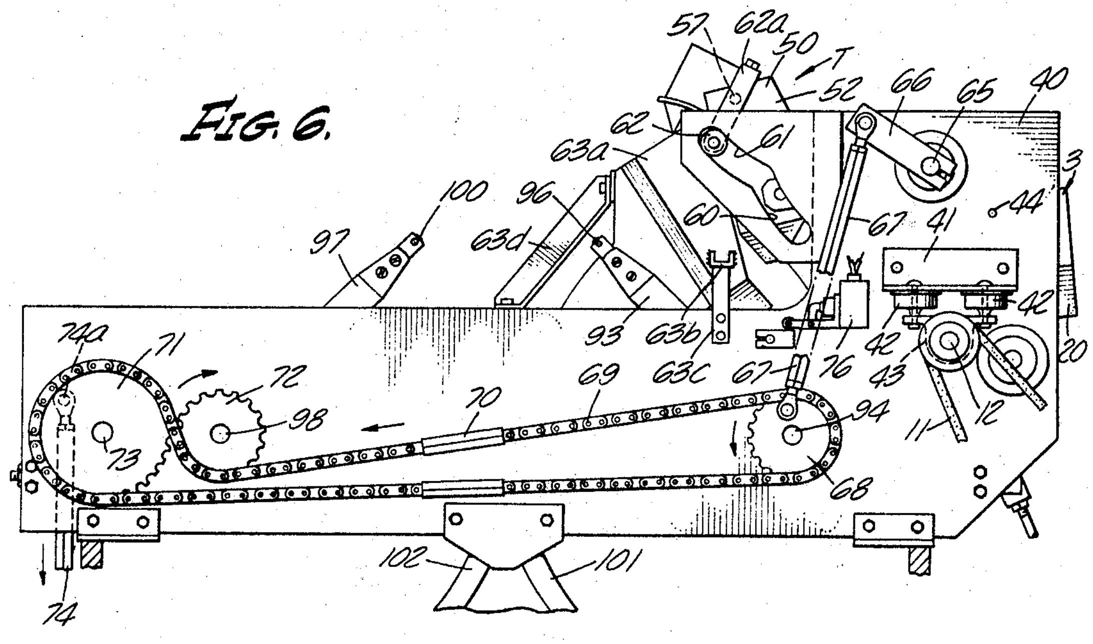
FIG. 6 is a fragmentary view in vertical section as taken on the line 6—6 of FIG. 5 and more particularly illustrating in side elevation the fruit transfer, centering and cutting assembly.
Figure 7:
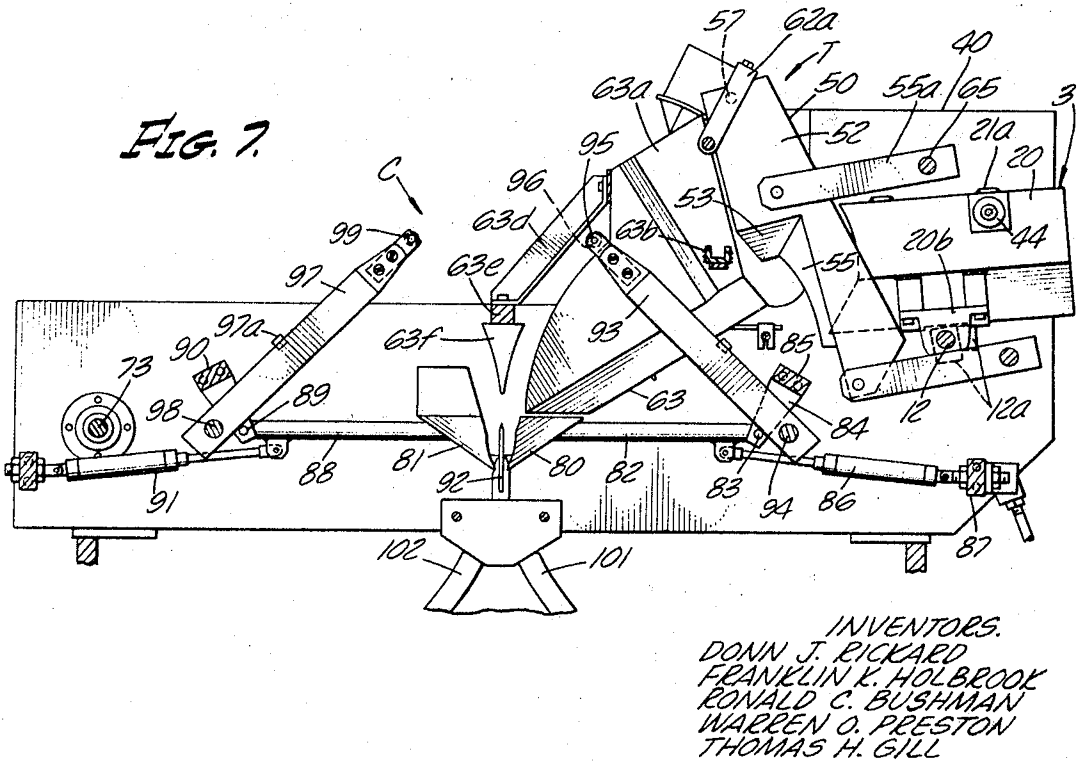
FIG. 7 is a fragmentary view in vertical section as taken on the line 7—7 of FIG. 5 disclosing the interior of the assembly of FIG. 6.
Figures 8A, 8B:
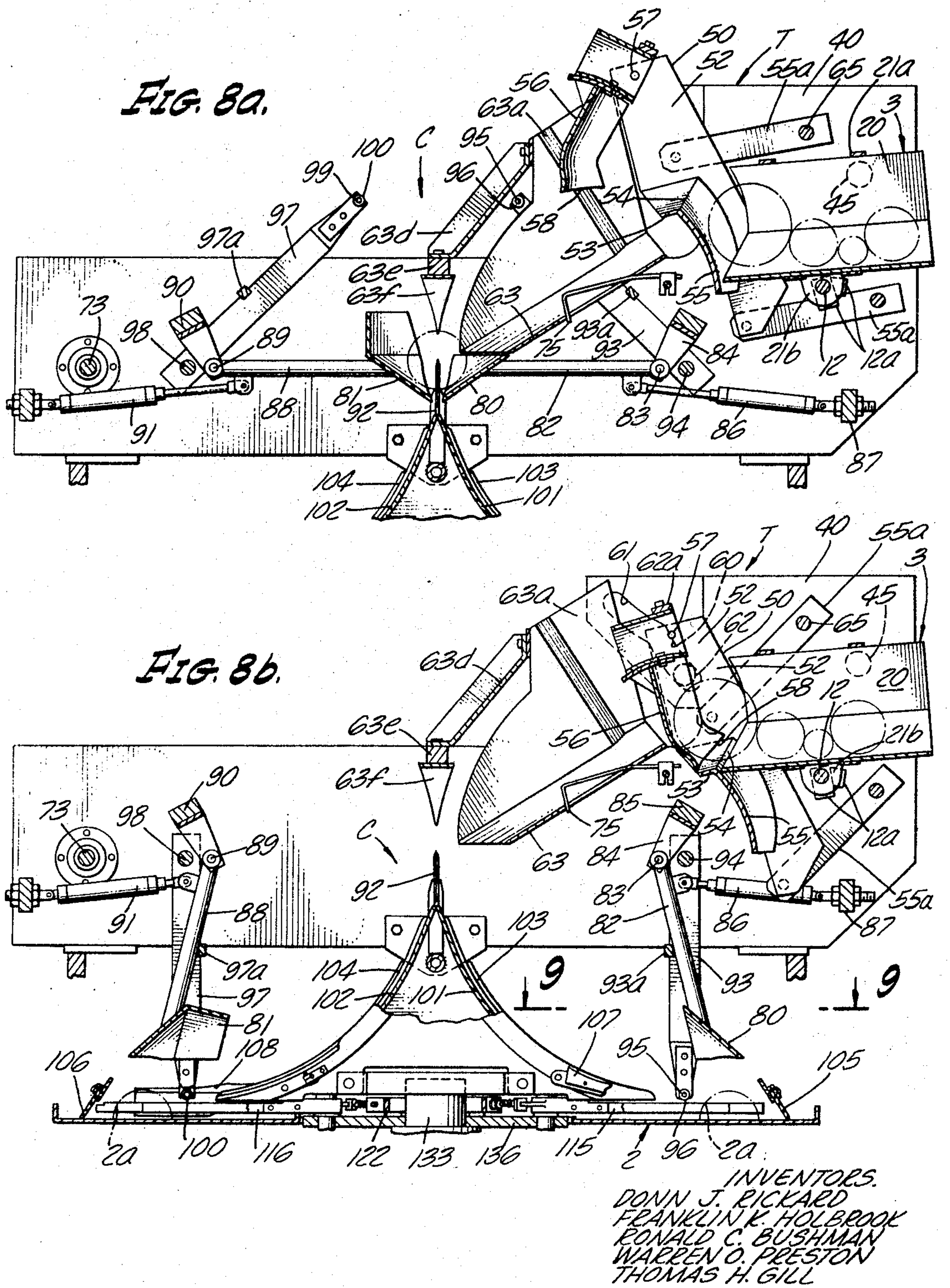
Figure 9:
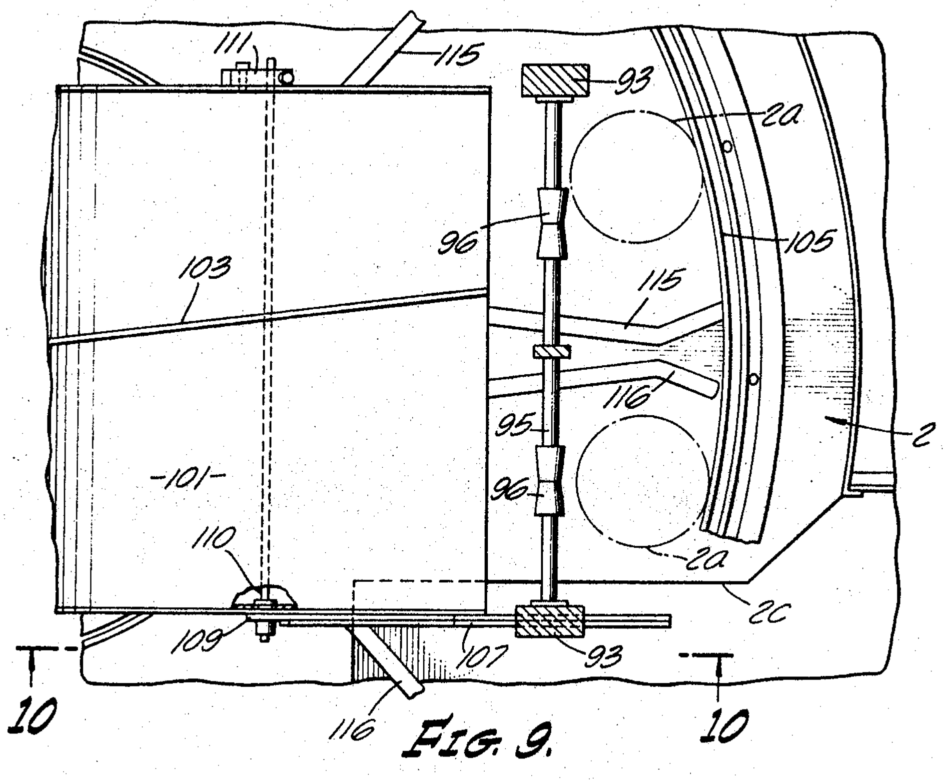
Figure 11:
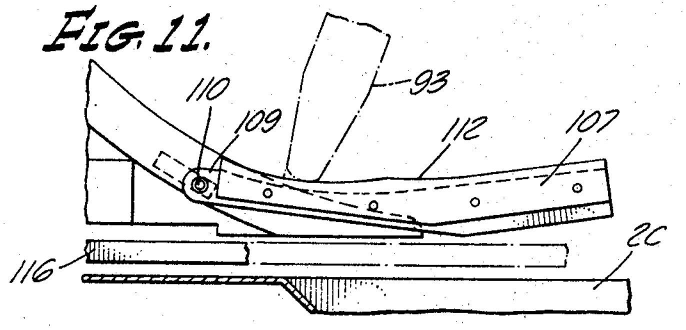
Figure 12:
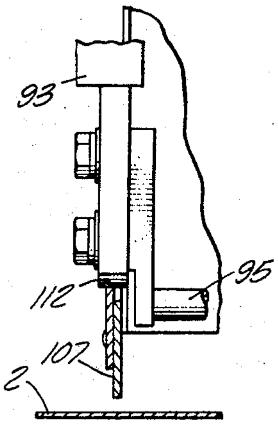
Figure 10:
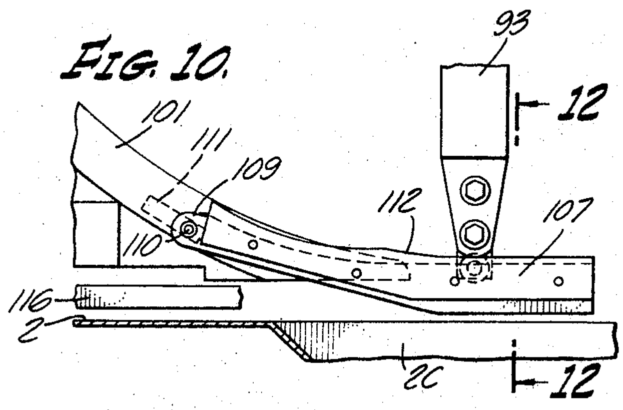
Figure 13:
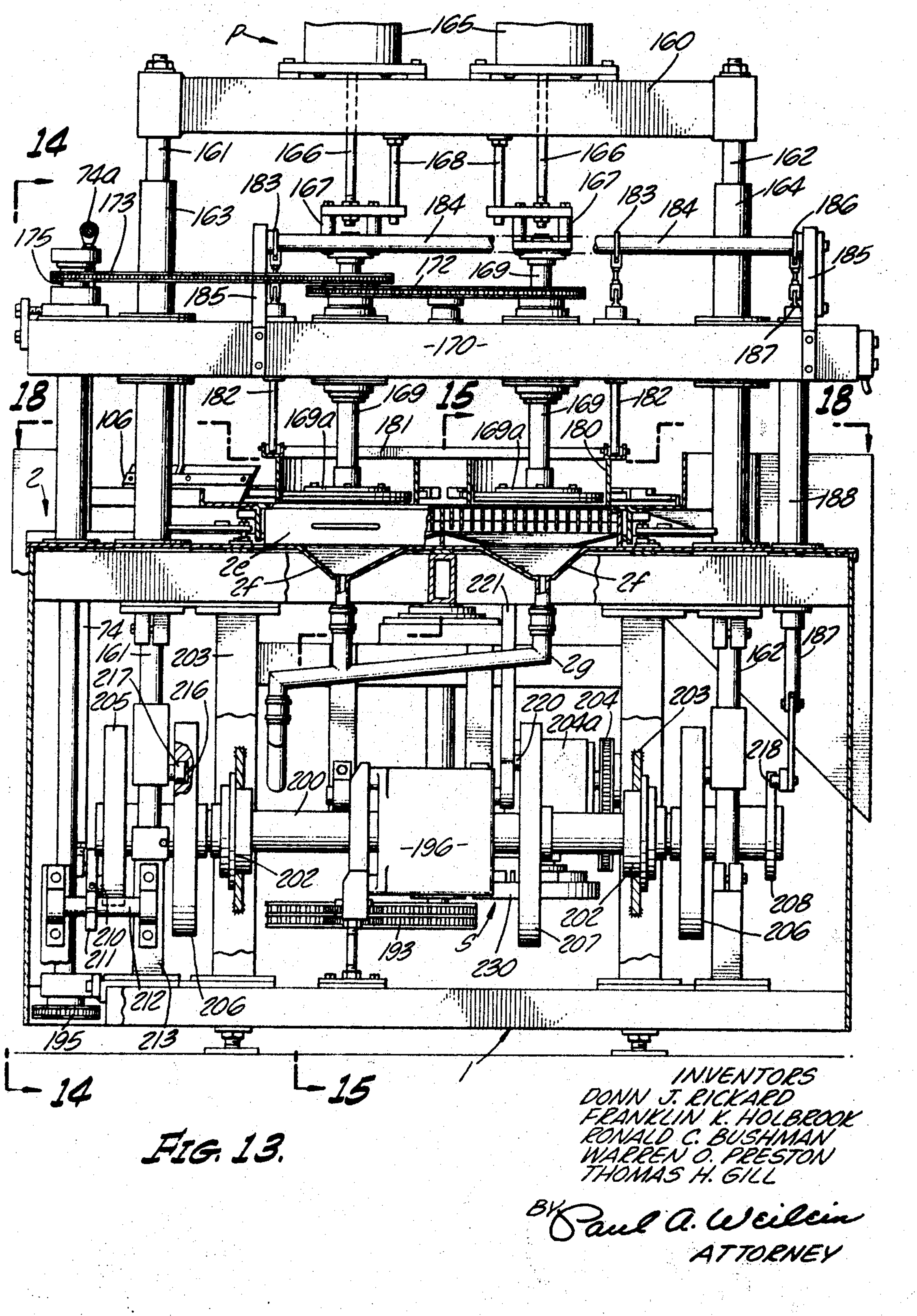
Figure 14:
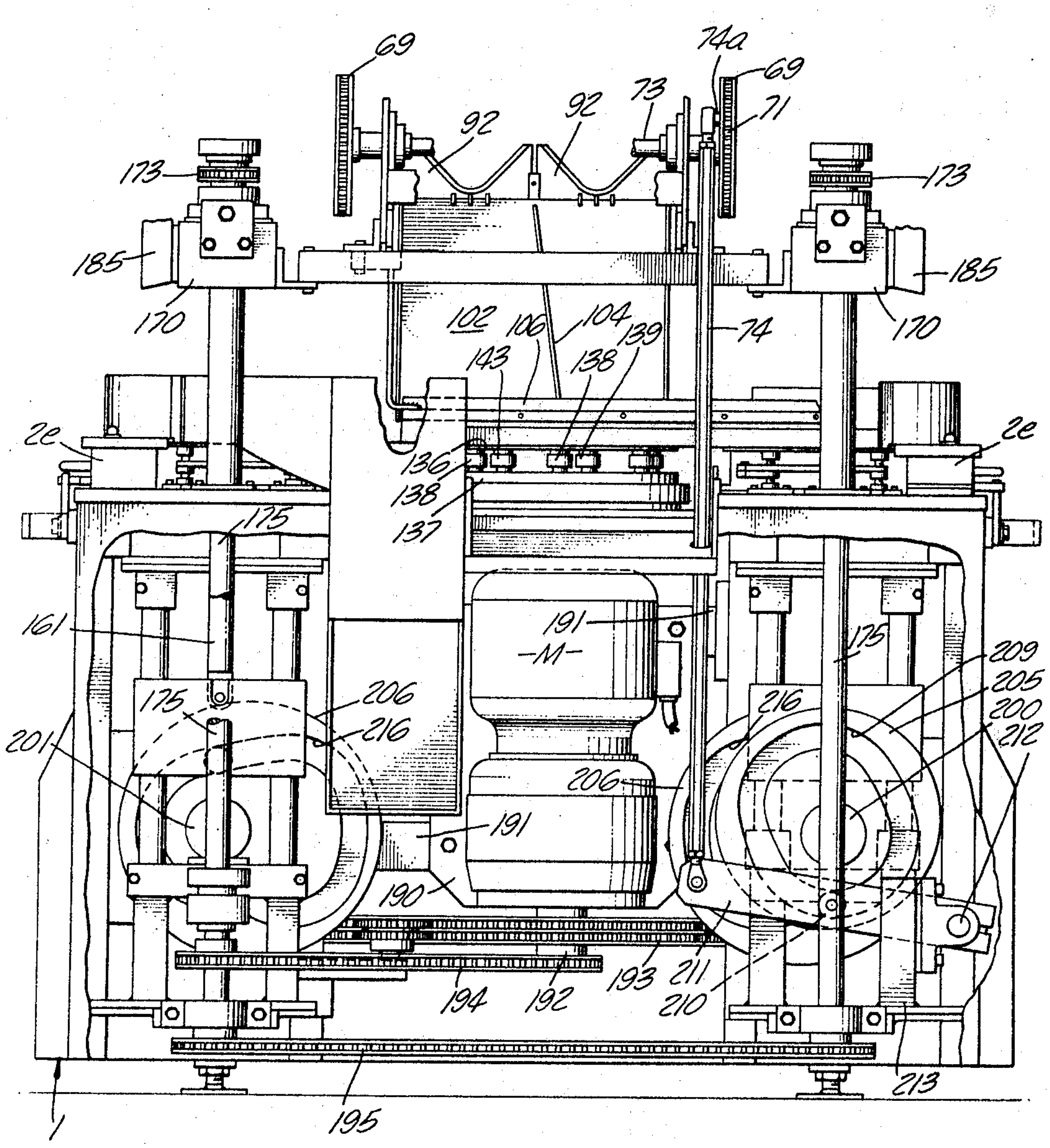
Figure 15:
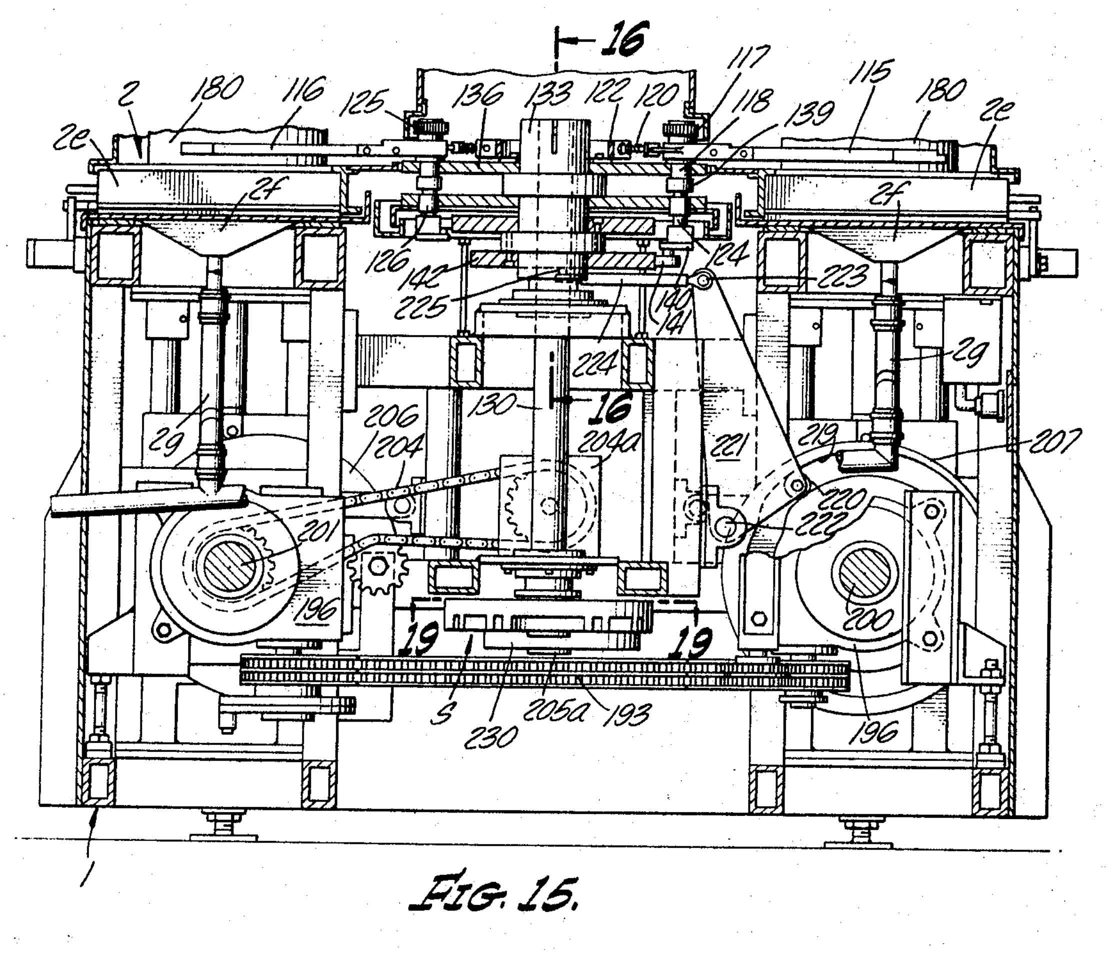
Figures 19, 20:
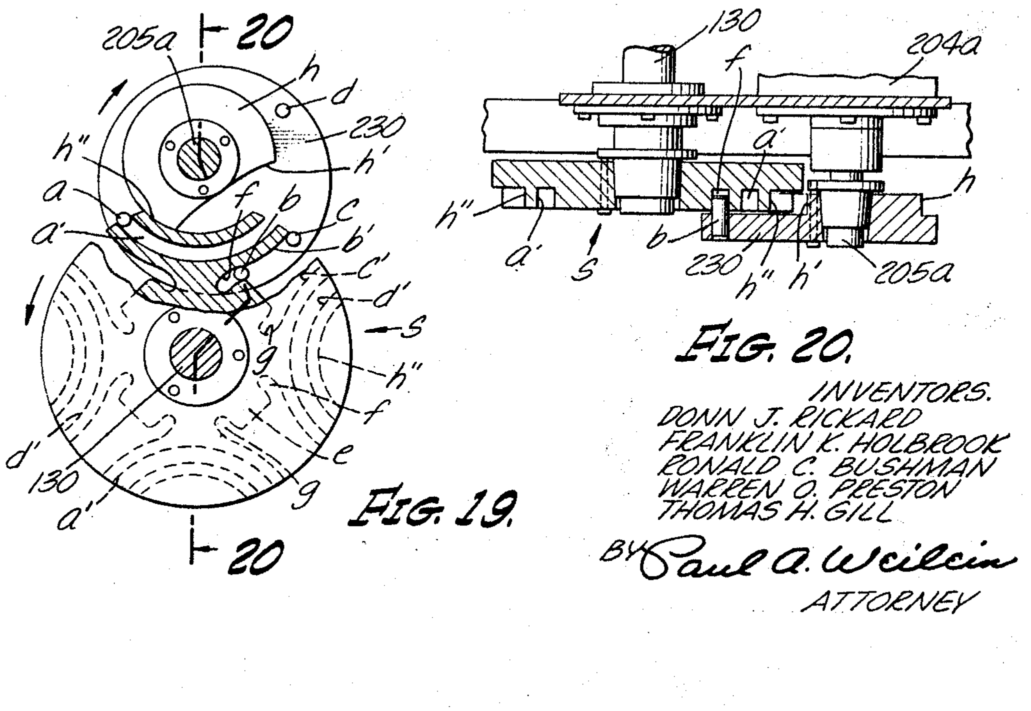
Figure 16:
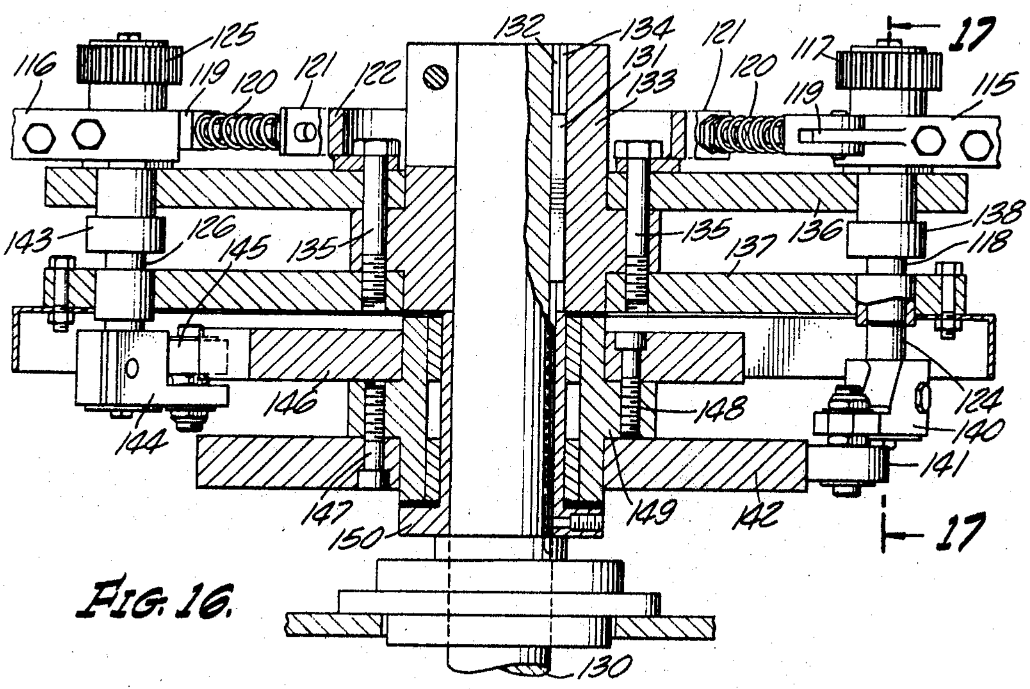
Figure 17:
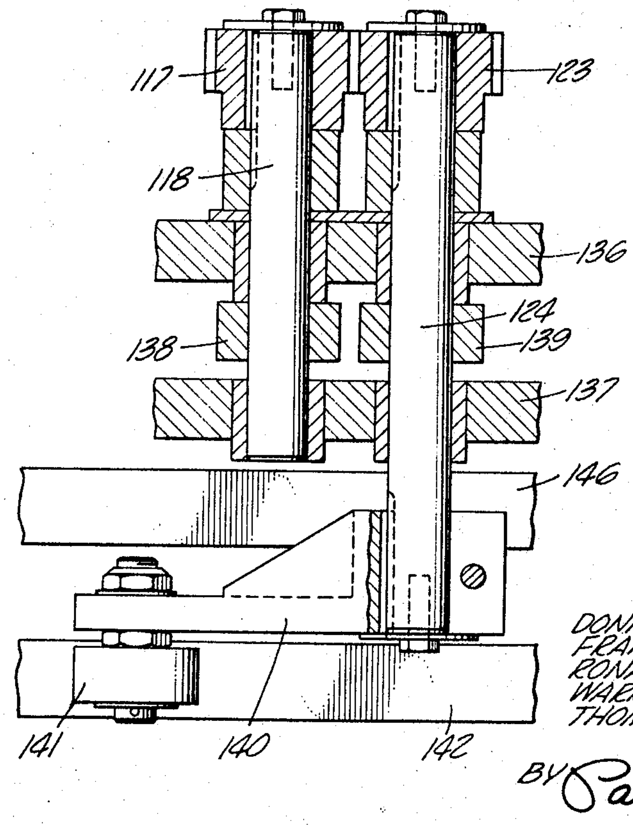
Figure 18A:
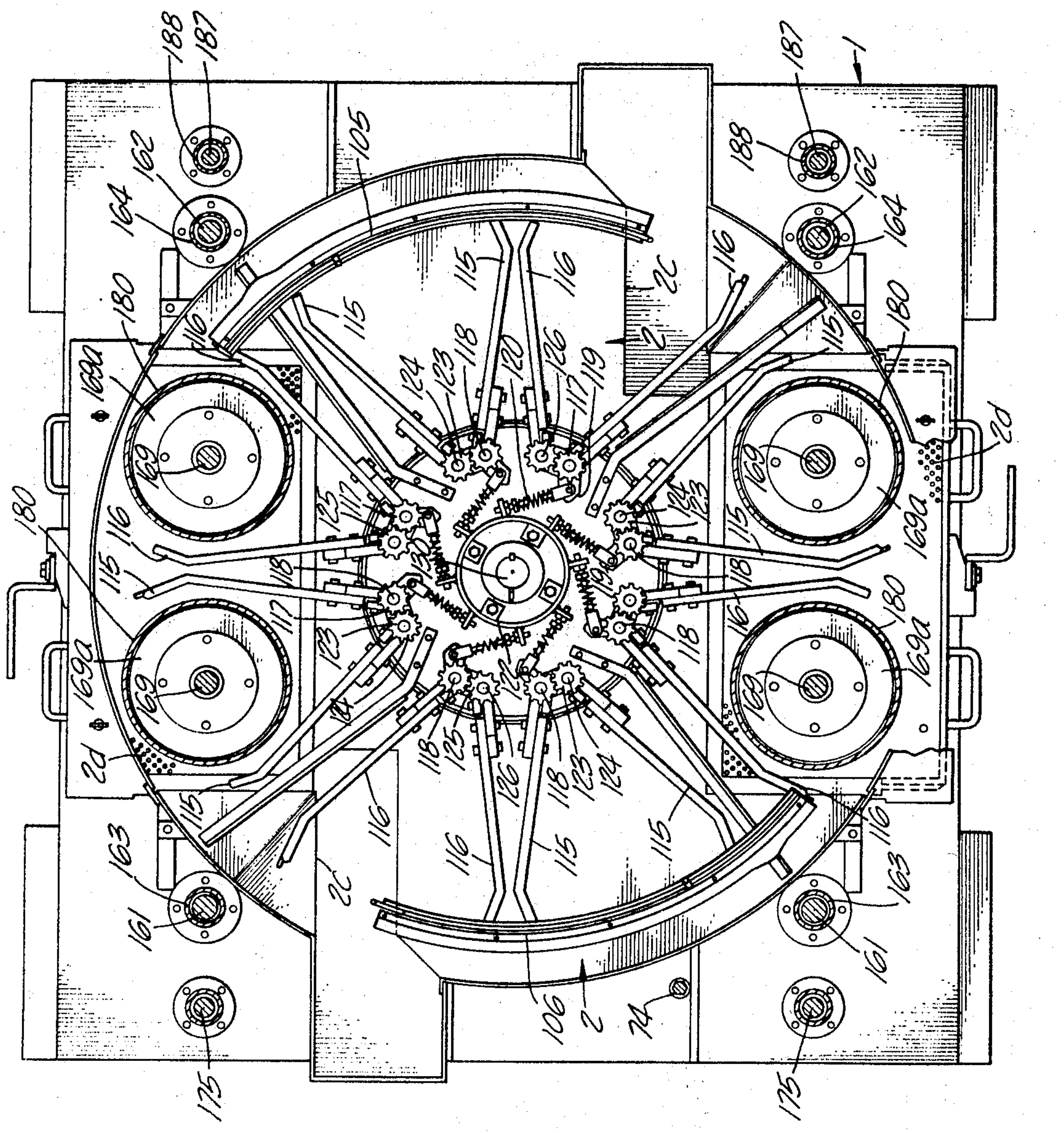
Figure 18B:
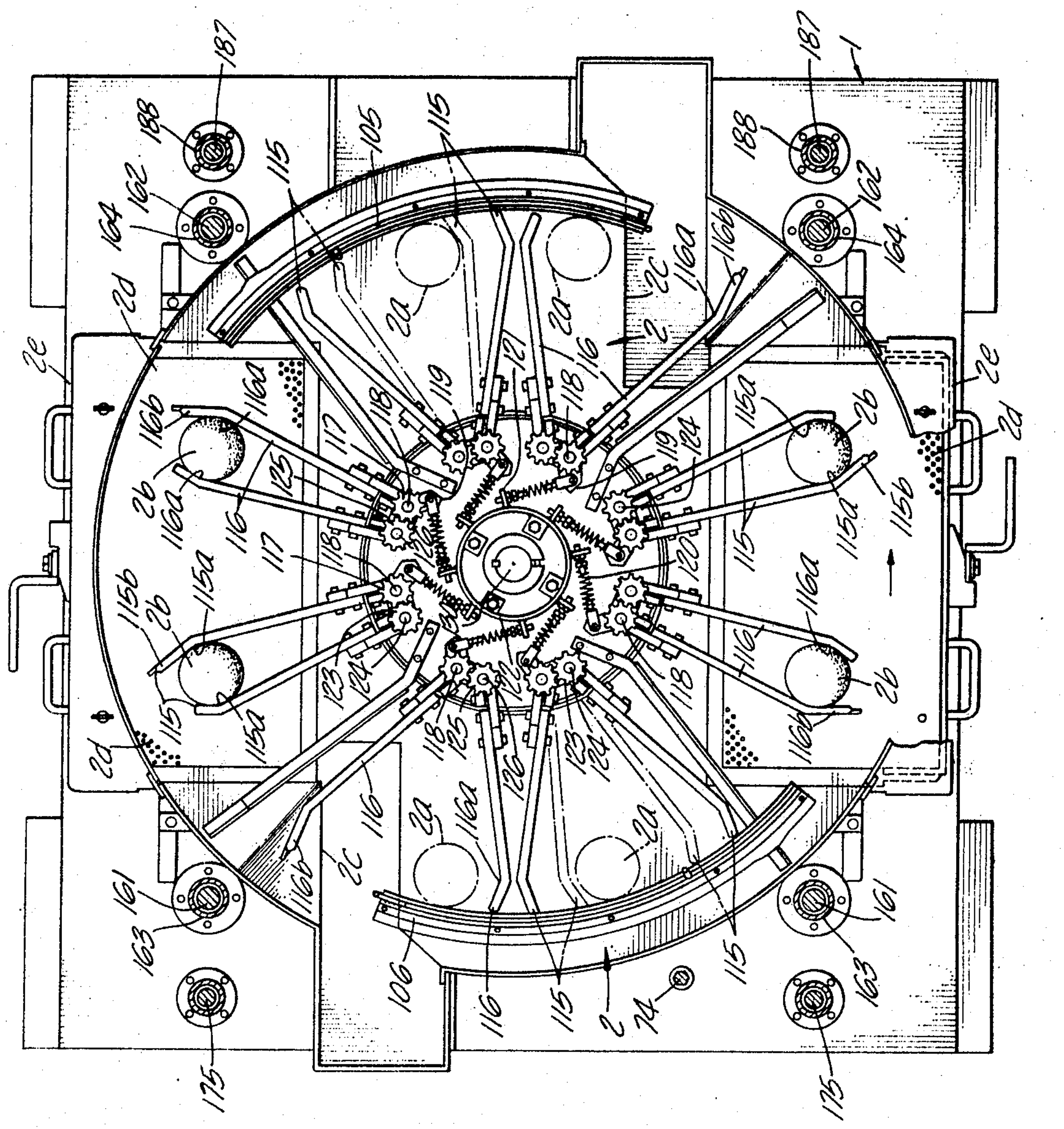
Figure 21:
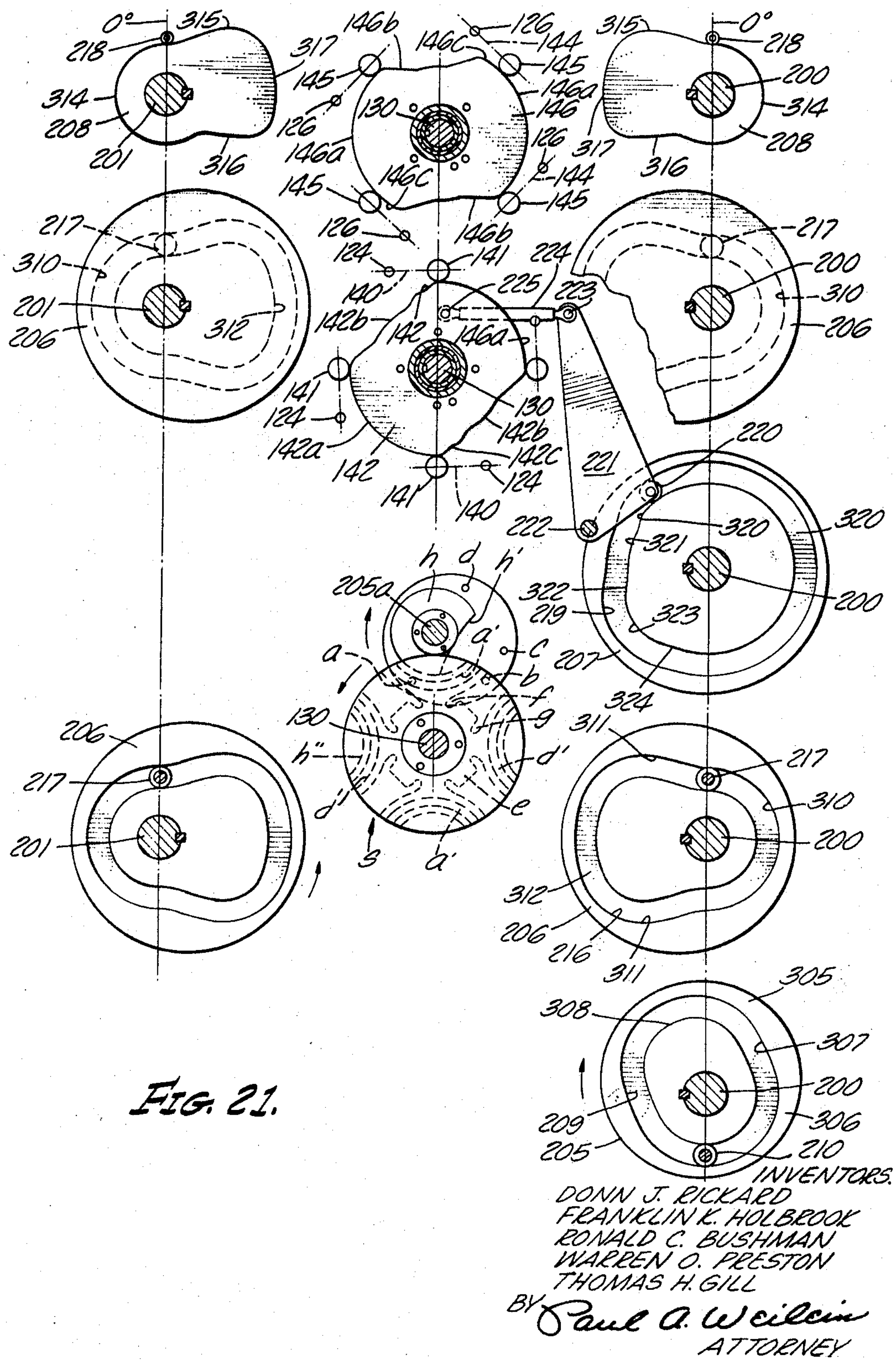
Figure 22:
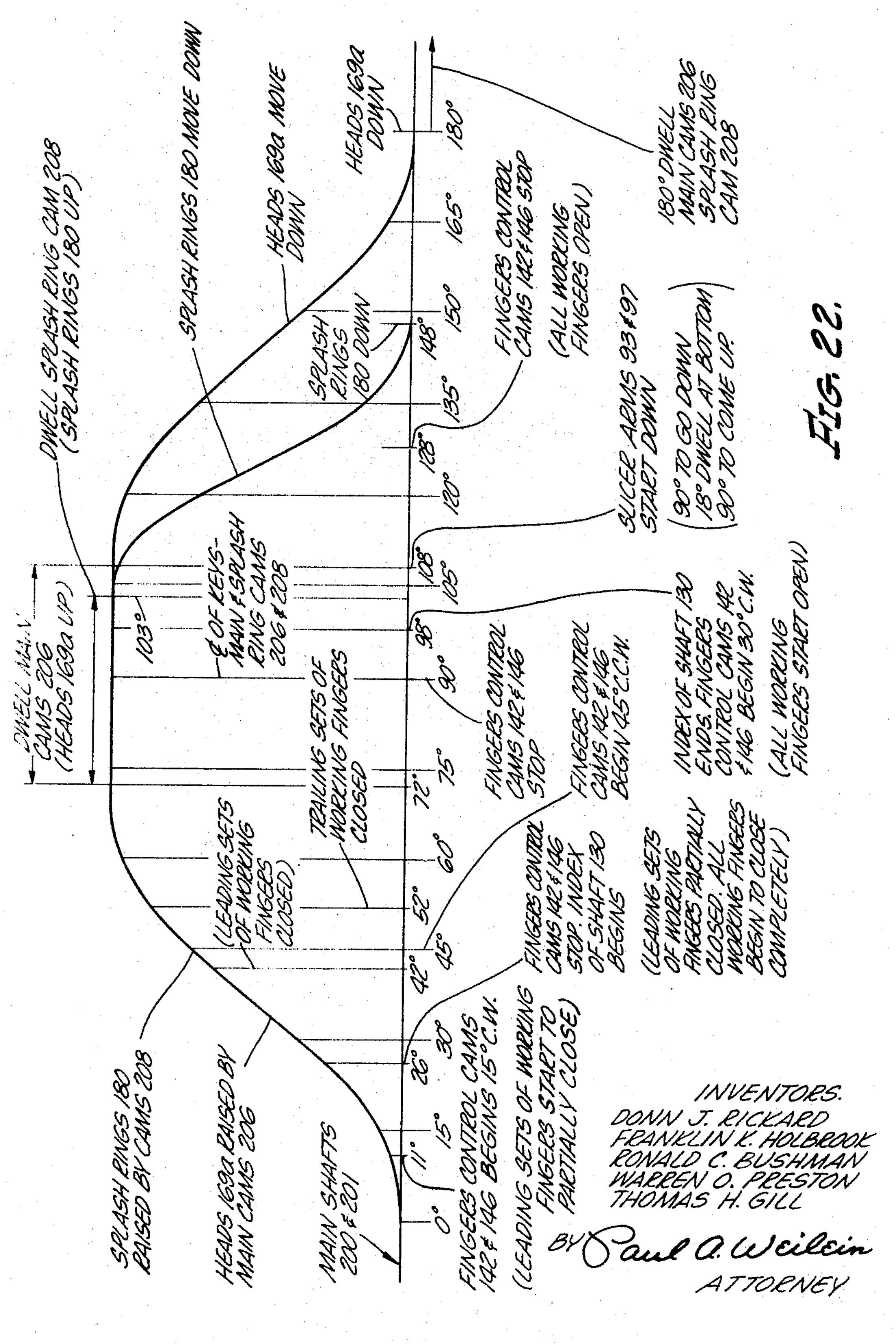

FIG. 8*a* is a fragmentary sectional view as taken on the line 8—8 of FIG. 5, and more particularly showing internal details of the apparatus of FIGS. 6 and 7, in a position for discharging fruit to the cutting means and showing a fruit in broken lines centered relative to the cutting knife;

FIG. 8*b* is a view corresponding to FIG. 8*a*, showing the transfer means in another position for receiving a subsequent fruit and showing the previously transferred fruit divided into halves located on the receiver platform;

FIG. 9 is a fragmentary view in horizontal section and on an enlarged scale as taken on the line 9—9 of FIG. 8*b* and showing the shiftable gate means for preventing inadvertent loss of a fruit half into the spent peel discharge opening;

FIG. 10 is a fragmentary view as taken on the line 10—10 of FIG. 9;

FIG. 11 is a view corresponding to FIG. 10 but showing the gate in an upper position to allow passage of the positioning fingers therebeneath;

FIG. 12 is a fragmentary view in vertical section as taken on the line 12—12 of FIG. 10;

FIG. 13 is a view in vertical section as taken on the line 13—13 of FIG. 5 and showing the general assembly and drive means at one side of the machine;

FIG. 14 is a fragmentary view showing in end elevation the portion of the left hand end of the apparatus embraced by the line 14—14 of FIG. 13 and showing the general assembly at the power or motor end of the machine;

FIG. 15 is a fragmentary transverse sectional view as taken on the line 15—15 of FIG. 13;

FIG. 16 is an enlarged detail view in section, as taken on the line 16—16 of FIG. 15;

FIG. 17 is a fragmentary detail view in section as taken on the line 17—17 of FIG. 16;

FIG. 18*a* is a view in horizontal section as taken on the line 18—18 of FIG. 13 showing the fruit half positioning means in a position adapted to receive cut fruit sections on the platform while other cut fruit sections are being pressed by the pressure heads;

FIG. 18*b* is a view corresponding to FIG. 18*a*, but showing another operative position in which fruit half sections have been moved to position for subsequent engagement by the pressure heads prior to opening of the positioning fingers, and showing in broken lines the initial partially closed position of the leading set of each pair of sets of cooperative positioning fingers;

FIG. 19 is a fragmentary detail view in horizontal section, as taken on the line 19—19 of FIG. 15, illustrating the improved star wheel drive for indexing the main shaft of the positioning means;

FIG. 20 is a view in vertical section as taken on the line 20—20 of FIG. 19;

FIG. 21 is a view diagrammatically illustrating the operating cam and star wheel mechanisms for effecting the successive operations in the transfer, cutting, positioning, and squeezing of successive fruit;

FIG. 22 is a diagram showing the sequence of machine functions and the timing thereof.

Like reference characters in the several views of the drawings and in the following description designate corresponding parts.

Figure 1:
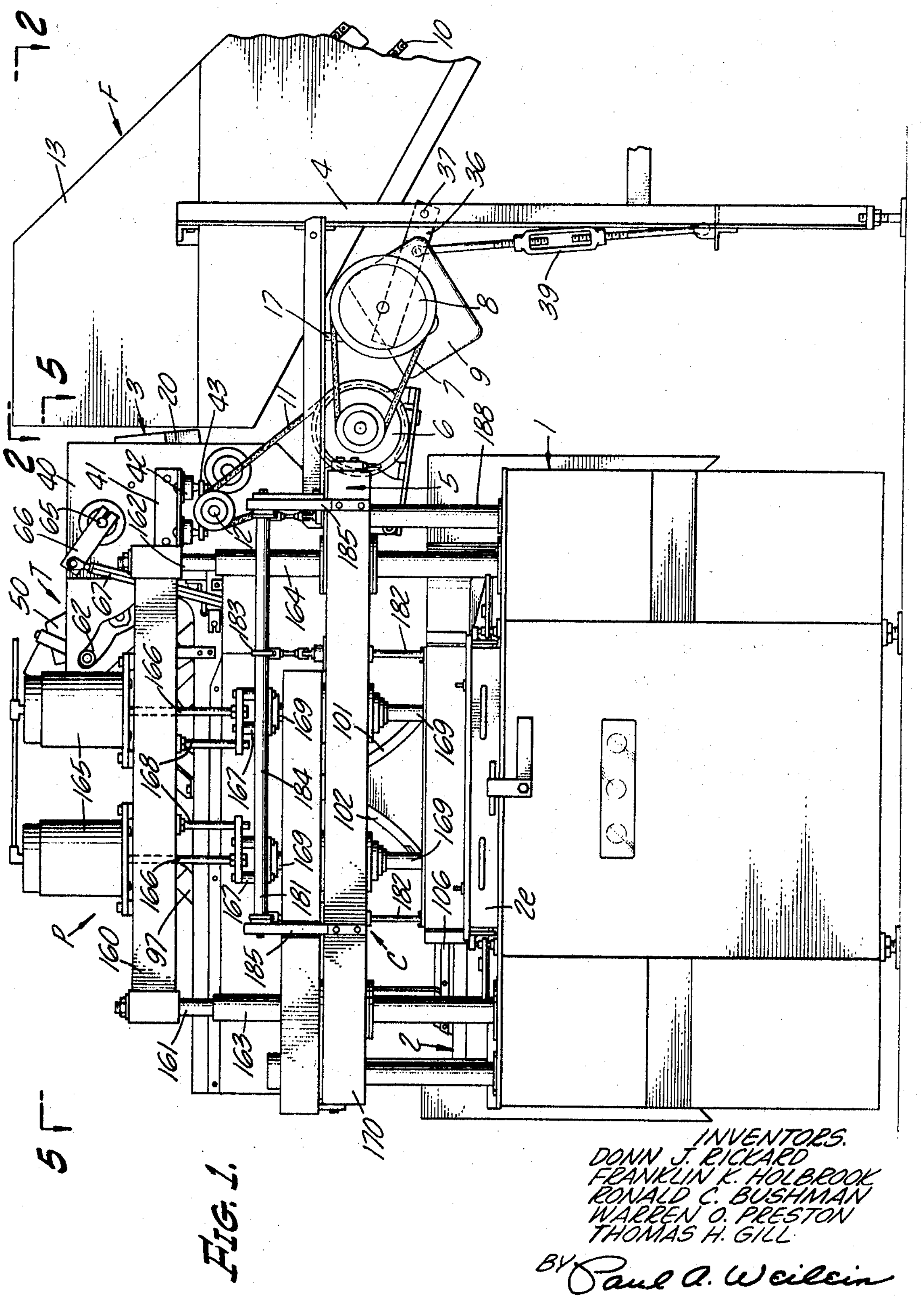
FIG. 1 is a view in side elevation illustrating a citrus fruit feeding and juicing apparatus embodying the invention.

Referring to FIG. 1, the citrus fruit juicing apparatus and feed means therefor of the present invention is shown as generally comprising a base assembly 1 of suitable construction, as will hereinafter appear, and which is preferably shrouded to house therein drive means for effecting operation of the juice extraction apparatus. The juice extraction apparatus includes a platform or table 2 onto which halved fruit is to be delivered, as shown in broken lines in FIG. 18*b*, to positions 2*a*, in response to the operation of cutting means C, whole fruit being supplied to the cutting means in succession from fruit transfer means generally denoted at T from chute means 3 to which fruit is supplied by feed means F. Halved fruit sections on the platform 2 will be moved from positions 2*a* to positions 2*b*, as shown in full lines in FIG. 18*b*, on grids for the application of juice expressing pressure by pressure applying means P, and the juice expressed from the cut fruit sections will be discharged to a suitable receptacle, while the spent peel will be otherwise discharged through discharge openings 2*c* in the platform for separate collection.

The fruit halves shown at positions 2*b* in FIG. 18*b* are disposed upon grid plates 2*d* so that upon the application of pressure to the fruit halves, the juice will be expressed therefrom and will pass through small openings in the plates 2*d*. These plates are on a plane with the platform 2 and form the upper surface of removable grid assemblies 2*e* which are of such construction as to afford a rigid support beneath the plates 2*d* to prevent deformation of the latter. The grid assemblies 2*e* are removably supported by the base frame assembly. Beneath each grid assembly, as seen in FIG. 13, is a funnel 2*f* adapted to gather the juice passing through the grid plates and conduct the same to juice discharge conduit means 2*g* which lead beneath the platform 2 to a suitable common collector (not shown), as is customary in apparatus of the type here involved.

*Feed means*

The feed means F, as seen in FIG. 1, includes a suitable supporting framework 4 connected to a superstructure 5 which is mounted upon the base 1 of the juice extraction apparatus. The superstructure 5 supports a power means or motor 6 which is suitably connected as by a drive belt 7 to a drive pulley 8, the latter operating to drive through a reduction gear assembly 9 feed conveyor means including an endless feed conveyor chain denoted at 10. The motor 6 also drives a further belt 11 which drives a pulley shaft 12 for the purpose of effecting vibration of the chute means 3, as will hereinafter more fully appear.

Figures 2, 3, 4:
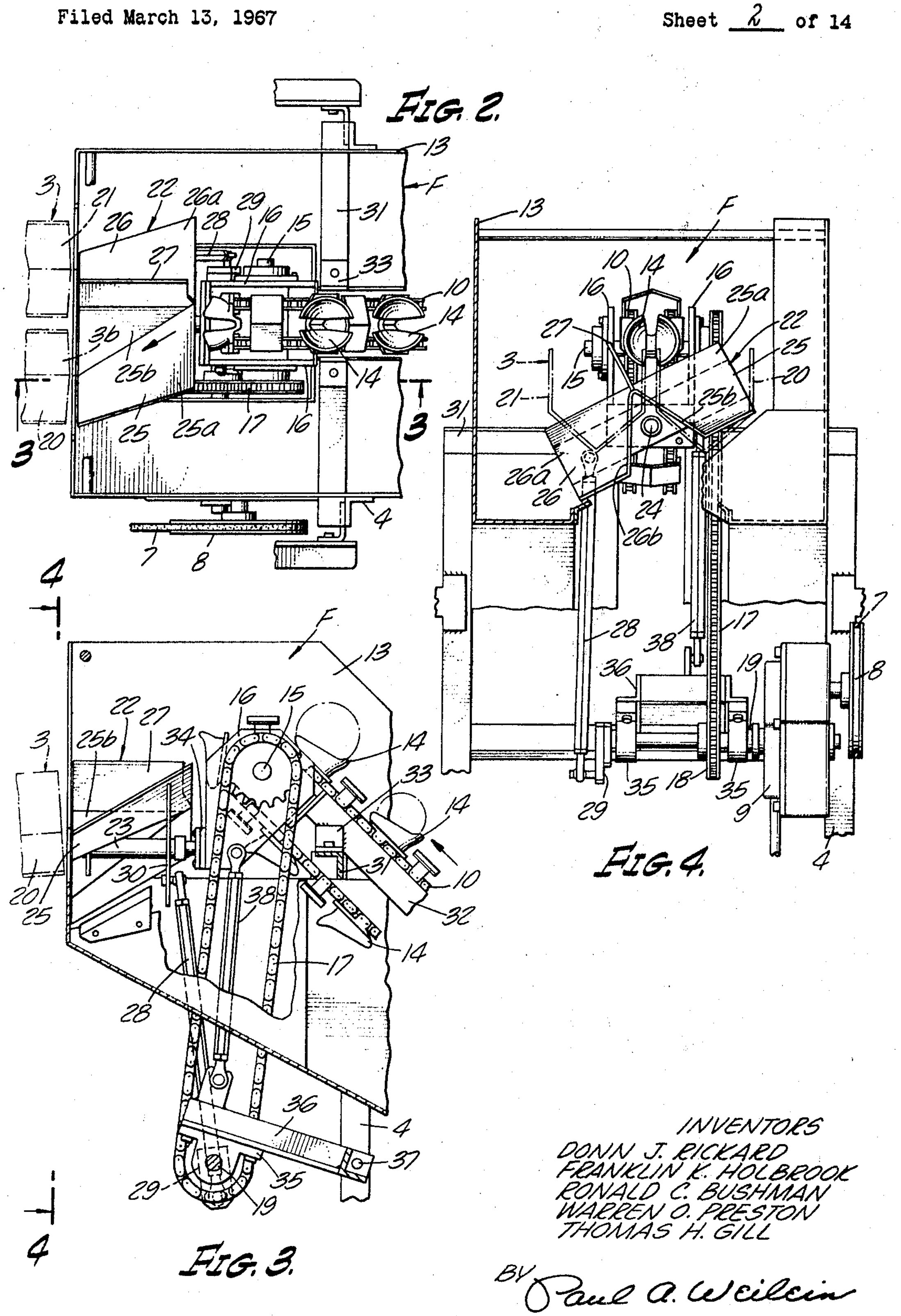
FIG. 2 is a top plan view of the fruit feeding apparatus, as embraced by the line 2—2 of FIG. 1.
FIG. 3 is a vertical sectional view as taken on the line 3—3 of FIG. 2.
FIG. 4 is a vertical sectional view as taken on the line 4—4 of FIG. 3.

Referring more particularly to FIGS. 2–4, it will be noted that the conveyor chain 10 is enclosed within side walls of an open topped housing 13 and includes a series of pocket members 14 adapted to travel with the endless chain at the lower end thereof through a source (not shown) of fruit to be juiced. The conveyor chain 10 extends at its upper discharge end about sprockets on a shaft 15 journalled in bearings carried by upstanding support walls 16 and this shaft 15 is in turn driven by chain 17 connected to a sprocket 18 on the output shaft 19 of the reduction gear assembly 9.

The conveyor assembly thus far described is essentially conventional. However, in the case of the present invention it is desired that successive fruit being elevated by the conveyor from the source be directed into the above mentioned chute means 3 which, as best seen in FIG. 2, includes a pair of parallel chutes 20 and 21 of V-section interconnected by cross members 21*a*. Therefore, means are provided for diverting the travel of successive fruit discharged from the cups 14 as they pass over the top of the feed conveyor alternately to the chute 20 and the chute 21. This diverter means includes a guide member generally denoted at 22 and supported for pivotal movement on a hub 23 which is rockable about a horizontal axis on a shaft 24 horizontally supported at the upper discharge end of the feed conveyor.

This guide member 22 includes a pair of guide sections 25 and 26 for respectively guiding a whole fruit received therein to the respective chutes 20 and 21. As seen in FIG. 4, the guide member section 25 is composed of an angularly disposed wall 25*a* leading forwardly from adjacent the discharge end of the feed conveyor. The wall 25*a* forms cooperatively with a wall 25*b*, a path for guiding a fruit laterally of the central plane of the feed conveyor to the right as viewed in FIG. 4 and into the chute 20 as a fruit is discharged from one of the cups 14. Projecting laterally with respect to the axis of shaft 24 is a baffle wall 27 which serves to assure deflection of a fruit as it leaves cup 14 into a path defined by the divergent walls 25*a* and 25*b*. The guide member section 26 includes like section 25, a wall 26*a* and another wall 26*b* which diverge and cooperate to form a path which will lead to chute 21 when the guide member 22 is rocked about the axis of a shaft 24 to a position at which the baffle wall 27 is on the other side of the central plane of the feed conveyor from that shown in FIG. 4, in which position the baffle wall 27 will, of course, assure deflection of a fruit passing from a cup 14 into the path defined by walls 26*a* and 26*b*.

Means are provided for oscillating the guide member 22 in timed relation to the feed conveyor chain 10 so that upon the discharge of each successive fruit from a cup 14 of the feed conveyor, the guide member 22 will be oscillated to shift the baffle wall 27 to the opposite side of the central plane of the feed conveyor. Such means for oscillating the guide member 22 includes a crank arm 28 driven by a crank 29 which is supported at the free end of drive shaft 19 driven by the gear drive 9. The upper end of the crank arm 28 is connected to a plate 30, this plate 30 being connected to the sleeve or hub 23 rockable about the above noted shaft 24. Thus, since the means for oscillating the guide member 22 and the means for driving the conveyor chain 10 are commonly driven, the guide member and conveyor inherently work in timed relation.

Any suitable support structure may be provided for the guide member 22 and its drive means, as well as for the conveyor 10. Illustratively, however, the frame structure 4 includes a cross beam 31 to which the upper end of conveyor rails 32 are connected by brackets 33. The walls 16 supporting the sprocket shaft 15 for conveyor drive chain 17 are carried by the rails 32 and support as at 34 the shaft 24 on which the guide member 22 is rockable. The gear drive 9 which drives the chain 17 has its shaft 19 journalled in bearings 35 beneath a support 36 which is pivotally mounted as at 37 on the frame structure 4 previously referred to. Extended between one of the walls 16 and the support 36 is a turnbuckle 38 which will maintain proper tension in chain 17. In addition, the connecting rod 28 which effects oscillation of guide 22 may be in the form of a turnbuckle so as to enable adjustment of the guide 22 in relation to the discharge end of the feed conveyor 10. Another turnbuckle 39 is connected to the housing of gear drive 9 and to the frame structure 4 to absorb the reaction of the gear drive and to adjust the tension of belt 7 from motor 6.

The chutes 20 and 21 of the feed means are slightly inclined so as to facilitate gravitational movement of the fruit downwardly toward the transfer means T previously referred to, as fruit are successively guided or deflected by guide 22 into one of the chutes and then the other. In order to assure such gravitational movement while minimizing the inclination of the chutes 20 and 21, the shaft 12 driven by belt 11 from motor 6 is employed, as indicated above, to effect vibration of the chutes 20 and 21. In this connection, the chutes 20 and 21 are disposed between side walls 40 of a subassembly including the transfer means T and certain elements of the cutting means C and on these walls 40, as seen in FIGS. 1, 5, and 6, are mounted resilient bumper assemblies 41 having resiliently supported bumpers 42 engaging bearing blocks 43 through which shaft 12 extends.

As seen in FIGS. 7, 8 and 8*a*, the shaft 12 extends beneath the chutes 20 and 21 and through bearing assemblies 20*b* and 21*b* suitably mounted beneath the respective chutes. Suitable means are provided for causing movement of the shaft to effect corresponding movement of the chutes 20 and 21. In the illustrative embodiment eccentric means are provided more particularly in the form of eccentric weights 12*a* mounted on the shaft 12 and adapted to be adjustably positioned in relative angular positions to provide for the desired centrifugal force tending to vibrate the chutes 20 and 21. The motion of the chutes 20 and 21 is determined by the provision of pivots 44 and 45, such pivots being resiliently mounted on the opposing side walls 40 and connected to the respective chutes 20 and 21. Thus, as the shaft 12 is rotated by the motor 6, the chute means 3 comprising the chutes 20 and 21 will rapidly oscillate about their pivots 44 and 45. Thus, the chutes may be inclined at only a slight angle to the horizontal but, nevertheless, fruit of various shapes which might not tend to roll will be caused to move down the chutes preferably without "boiling," i.e., climbing on one another, as they pass toward the transfer means now to be described. An important feature of the guide 22 is that any fruit which fails to enter either of the chutes 20, 21 from the guide, owing to the chute being full, will roll from the guide back to the hopper when the corresponding end of the guide rotates downwardly.

*Transfer means*

The transfer means T previously referred to, as seen in FIGS. 5–8*b*, is disposed between the side walls 40 which support the chutes 20 and 21. Included in the transfer means is a pair of fruit lifters 50 and 51 respectively adapted to transfer a fruit from the chutes 20 and 21 to the cutting means C. The fruit lifter 50 is representative of both of them and includes an upper fruit receiving section 52 which opens in the direction of the chute 20 and has a V-form in horizontal section so as to receive a whole fruit, as seen in FIG. 8*b*. At the bottom of the fruit receiving section 52 is a V-shaped ledge 53 which is comparatively narrow at its midsection and which progressively flares upwardly and outwardly, as seen in FIGS.

8*a* and 8*b* so that an edge 54 is formed, this edge being adapted to engage and support progressively larger fruit at progressively further outward positions along the edge 54. The fruit receiving section 52 is further provided with a downwardly extended barrier section in the form of a baffle wall 55 of generally V-shape in horizontal section and arcuate shape in vertical section.

Pairs of parallel links **55*a* support the fruit lifters 50 and 51** for movement between the fruit receiving position shown in FIG. 8*b* and the upper position shown in FIG. 8*a*, the fruit receiving section 52 being at all times slightly tilted so that the ledge 53 is inclined in such a direction as to cause the fruit engaged on the ledge to remain thereon so long as the center of gravity of the fruit is inwardly, i.e., to the left in FIG. 8*b*, of the edge 54 of the ledge 53.

The inner or rear wall of the fruit receiving section 52 is constituted by a pivotally mounted gate 56 which is pivotally connected as at 57 to the side walls of the receiving section 52, this gate 56 having at its lower end an edge 58 of arcuate form which cooperates with the ledge 53 to define with the edge 54 a diminishing ledge depth from the center of the ledge toward the outer ends of the ledge where it joins with the side walls of the receiver. Thus, in order for a fruit to be supported on the ledge 53 it must be centrally located on the ledge and with its center of gravity within the arcuate rear wall provided by the gate 56, or otherwise the fruit, upon upward movement of the fruit lifter 50, will roll from the ledge 53 off the edge 54 and back into the chute 20. The depending baffle wall 55 during upward movement of the fruit lifter 50 will, as shown in FIG. 8*a*, prevent loss of fruit from the chute 20 and upon return of the lifter 50 to the position shown in FIG. 8*b*, the next fruit in the chute 20 will move onto the ledge 53. The curvature of each fruit lifter baffle wall 55 in vertical section is such that the wall remains in close proximity to the trailing edge of the adjacent chute throughout the vertical travel of the corresponding fruit lifter.

Means are provided for opening the gate 56 of each lifter 50 and 51, following upward movement of the lifters, it being notable that due to the outwardly diminishing depth of ledge 53, only one fruit may remain on the ledge during upward movement of the lifters, that one fruit being centrally located on the ledge and any laterally displaced fruit inherently having its center of gravity located off the ledge, and therefore, returning to the chutes upon lifting of the lifters. The means for opening the gate includes a compound slot in each wall 40, including a first arcuate section 60 and a second arcuate section 61, the gate 56 of the respective lifters having a roller 62 carried on a brace **62*a* connected to the top of the gate and operable to open the gate as roller 62** travels in the compound slot. As best seen in FIG. 8*b*, the arcuate section 60 of the compound slot is on a curve struck substantially from the center of arcuate movement of the lifter 50 so that during the initial stage of upward movement of the lifter 50 the roller 62 simply rides in the slot section 60. However, when the roller 62 reaches the slot section 60 the gate 56 will be opened by the camming action of the upper slot wall against the roller 62. As seen in FIG. 8*a*, when the gates 56 of the lifters 50 and 51 are opened a fruit on the ledge of each lifter is free to fall therefrom onto a discharge chute including chute sections 63 and 64. Separating the chutes 63 and 64 and also separating the lifters 50 and 51 is a vertical baffle wall **63*a* so that fruit discharged from lifters 50 and 51 respectively will be confined to chutes 63 and 64. This baffle wall 63*a* is supported between side walls 40 by laterally extended braces 63*b* and brackets 63*c*, as well as by a transversely extended guard plate 63*d* which generally ovelies the chute 63 and 64 and is connected to the baffle 63*a* and to the walls 40 by a cross piece 63*e*, the latter having a central depending baffle 63*f*** located above the cutting means C.

In order to effect the movement of the fruit lifters 50 and 51 between the positions shown in FIGS. 8*a* and 8*b*, operating means are provided including a rockable shaft 65 to which the upper links of the parallel links **55*a* are connected so as to effect such movement of the lifters upon rocking of the shaft 65. Referring to FIGS. 5 and 6, it will be noted that the shaft 65 extends through the side walls 40 and at each of its ends a lever arm 66 is clamped or otherwise connected to the shaft 65. To the free end of each lever arm 66 is connected an adjustable pitman 67, in the form of a turnbuckle, and each pitman 67 is connected in eccentric relation to a sprocket 68, the sprockets 68 being mounted on the side walls 40** previously described.

Extended about each sprocket 68 is a drive chain 69 having adjustor means 70 therein, this chain being extended about a drive sprocket 71 adjacent the left hand end of the apparatus as viewed in FIGS. 5 and 6, there also being sprocket 72 engaged with each chain 69. The drive sprockets 71 are mounted on a transversely extended shaft 73 which extends between the side walls 40 so that the sprockets 71 and 72, as well as sprockets 68 will be rocked in unison upon rocking of one of the sprockets 71. Means for effecting such rocking of a sprocket 71 includes a rod 74 eccentrically connected as at **74*a* to the sprocket 71 shown in FIG. 6. Means, to be hereinafter described, are provided for effecting vertical reciprocation of the rod 74 with resultant oscillation or rocking of sprockets 71 and thus sprockets 68 to which pitmans 52 are connected whereby to rock levers 66 and shaft 65 to raise the fruit lifters 50 and 51** as aforesaid.

The cyclindrical operation of the transfer means just described results in the feeding of successive fruit onto both of the discharge chutes 63 and 64. If desired, the fruit discharged from the ledges 53 of the lifters 50 and 51 may engage switch arms 75, as best seen in FIGS. 8*a* and 8*b*. These switch arms 75 are adapted to actuate time delay switch mechanism 76 which, as seen in FIG. 6, may be mounted on one of the side walls 40 and which will control a drive motor, as will be hereinafter more fully described, so that in the event that a fruit has not passed down one of the chutes 63 or 64 for a predetermined period of time, then the apparatus will be shut off.

*Cutting means*

From the transfer means just described, the fruit are progressively supplied along chutes 63 and 64 to the fruit cutting means C which is best illustrated in FIGS. 7, 8*a*, 8*b*, and 9–12. The cutting means C includes a pair of cup-like members 80 disposed in transversely spaced relation and an opposing pair of similar cup-like members 81, each opposing pair of cup-like members 80, 81 being adapted to receive a fruit as it passes downwardly from one of the chutes 63 and 64. The cup-like members 80 are supported on arms 82 at the free end of the latter. Arms 82 are pivotally mounted at 83 between brackets 84 mounted on a cross piece 85 which spans and is mounted on side walls 40 of the fruit transfer and cutting subassembly. Means are provided for normally yieldably biasing the arms 82 and consequently cups 80 to the position shown in FIGS. 7 and 8*a*, for example, and such means in the illustrative machine includes air spring cylinders 86 connected to the arms 82 and adjstably mounted on a support 87 disposed between the side walls 40 of the subassembly. The cup-like members 81 which oppose the cup-like members 80 are similarly supported in arms 88 pivotally mounted at 89 to a cross piece 90 and are normally biased by air spring means 91 to the normal position shown in FIGS. 7 and 8*a*.

When in their normal positions, the cup-like members 80 and 81 form a pair of pockets separated by the central baffle **63*f* previously referred to. Transversely extended between walls 40 and disposed between the cup-like members, is a pair of knife sections 92** which, as best seen in FIGS. 8*a*, 8*b* and 14, are centrally depressed or arcuate at their cutting edges so that, as shown in FIG. 8*a*, when the fruit are received in the pockets the fruit will be supported wholly within the pockets without contact with the knife, and thereby the fruit will be substantially centered with respect to the knife.

In cyclical relation to the operation of the fruit transfer means and the deposit of pairs of fruit in the pockets defined between the cup-like members 80 and 81, a pair of pushers are operated to force the fruit downwardly with respect to the knives 92. One of these pushers cooperates with the fruit at the side of the pockets formed by cup-like members 80 and comprises arms 93 mounted on a shaft 94 which extends between the walls 40 and is connected to sprockets 68 (see FIG. 6). At their free ends, the pusher arms 93 support a transversely extended pusher rod 95 having spaced rollers 96 adapted to engage fruit in the pockets at the adjacent side of the knives in opposing relation to cup-like members 80. Likewise, the other pusher cooperates with the fruit at the other side of the pockets, and comprises pusher arms 97 mounted on a shaft 98 extending between walls 40 and connected to sprockets 72 (see FIG. 6). A pusher rod 99 extends between the free ends of pusher arms 97 and has rollers 100 engageable with the fruit in the pockets at the adjacent side of the knives in opposing relation to the cup-like member 81.

Thus, as seen in FIG. 6, the shafts 94 and 98 will be caused to oscillate in opposite directions, as shown by the arrows, by chain 69 which engages the sprockets 68 and 72 as previously described and which effects oscillation of the rock shaft 65 which serves to operate the parallel linkage support for the fruit lifters 50 and 51.

The pushers 93 and 97 are adapted upon downward movement to engage the fruit resting in the pockets 80, 81 and force the fruit downwardly over the cutting edges of the knives 92 to divide the fruit in half sections. In forcing the fruit downwardly and dividing the same, the pushers, and more particularly the roller elements 96 and 100 remain in engagement with the separate fruit halves and force the same downwardly. Corresponding downward movement of the cup supporting arms 82 and 88 against 86 and 91 is caused by cross members **93*a* and 97*a* extended between pusher arms 93 and 97** and engageable, as seen in FIG. 8*b*, with arms 82 and 88.

The fruit halves are guided from the knives in opposite directions by downwardly and outwardly flaring guide walls 101 and 102 and from these guide walls the fruit passes onto the platform 2. Inasmuch as a pair of fruit are being divided, the opposite halves of each fruit will be located on opposite sides of the platform and preferably approximately in locations **2*a* referred to above so as to be engaged by positioning means hereinafter to be described and moved to angularly spaced locations 2*b*** for engagement by the pressure applying heads of the pressure applying means P.

In order that the cut fruit halves will be initially disposed in desired locations on the platform 2, the downwardly and outwardly flaring guide surfaces 101 and 102 are preferably each provided with a baffle wall 103 and 104, respectively, which is disposed at an angle so as to deflect one of the fruit halves severed by one knife 92 and descending guide surface 101 slightly laterally in one direction, while one of the fruit halves severed by one knife 92 and descending guide surface 102 will be reflected laterally in the other direction. In order to limit outward sliding movement of the fruit halves along the surface of platform 2 following the discharge of the fruit halves from the downwardly and outwardly flaring guide surfaces 101 and 102, as best seen in FIGS. 8*b* and 9, an arcuate baffle 105 is supported on the platform in confronting relation to the guide surface 101 and a similar arcuate baffle 106 supported on the platform in confronting relation to the guide surface 102, These baffles extend arcuately from adjacent the respective peel discharge openings **2*c* approximately to the grids 2*d*** upon which the fruit halves are to be located for the application of pressure by the pressure applying means P.

In order to prevent the inadvertent travel of a cut fruit half into either of the peel discharge openings **2*c*, the guide 101 and the guide 102 on their respective sides adjacent the peel discharge openings are provided with gate means operable by the pusher means described above and more particularly by the pusher arms 93 and 97. Guide 101 is provided with a gate 107 while guide 102 is provided with a gate 108**, as best seen in FIG. 8*b*. Referring to FIGS. 9–12, the guide 101 and its associated gate 107 is shown in detail and is representative of the gates 107 and 108. Gate 107 is pivotally mounted at 109 on a torsion rod 110 which constitutes resilient means for normally maintaining the gate 107 in the upper position as shown in FIG. 11. The torsion rod 110 extends transversely beneath the guide 101 and is connected to the opposite side of the guide from the gate 107 by a clamp 111. Gate 107 has an upper edge 112 engageable by the lower extremity of one of the pusher arms 93, so that as the pusher swings downwardly it will engage the gate 107 and move it downwardly, but upon return movement of the pusher, the gate will be biased upwardly to allow the passage therebeneath of the positioning fingers hereinafter to be described.

*Positioning means*

The positioning means previously referred to are adapted to engage fruit halves on the platform 2 at locations **2*a* adjacent the discharge end of the guide chutes 101 and 102 and to transfer the cut fruit halves to the positions 2*b* on the grids 2*d*** substantially in axial alignment with the pressure heads with which such fruit halves will subsequently be engaged. The positioning means includes sets of angularly disposed positioning fingers. For purposes of description, and with particular reference to FIGS. 18*a* and 18*b*, the fingers will be understood to comprise four pairs of sets of fingers, each pair of sets including a leading set 115 and a trailing set 116, each pair being angularly spaced 90° from the adjacent pair. Each pair of sets of fingers is adapted to engage a pair of fruit halves at locations **2*a* and move the same to locations 2*b*** upon indexing of the entire positioning finger assembly. Moreover, the leading sets of fingers are adapted to be partially closed, as shown in broken lines in FIG. 18*b*, in advance of indexing motion of the finger assembly.

Referring still to FIGS. 18*a* and 18*b*, it will be noted that the positioning fingers of each set comprise a pair of outwardly divergent arms having adjacent their outer extremities angularly disposed end portions forming depressions **115*a* and 116*a* in the confronting sides of the fingers 115 and 116, respectively, whereby to locate the fruit halves between the fingers on a common circle substantially intersecting the axis of the pressure heads by which the juice will be extracted from the fruit halves. The trailing finger of each set of fingers 115 and 116 has an end portion respectively designated 115*b* and 116*b*** slightly greater in outward extent than the end portion of the leading finger of each set so that it is impossible for the ends of the fingers to grip a fruit half in the manner of a caliper and interfere with movement of the fruit half into the opposing recesses of the respective sets of fingers.

Means are provided for simultaneously moving the fingers of certain of the sets of fingers toward one another so as to engage and position a fruit half therebetween. It will be noted in this connection, that each trailing finger of the sets of fingers 115 and 116 is mounted upon a pinion 117 fixed on a shaft 118. Projecting from the shaft 118 of each pinion is a lever 119 engaged by a compression spring assembly 120. Each of the compression spring assemblies acts against a projection 121 extended outwardly from a ring 122 constituting a part of the finger supporting means hereinafter to be described so that the respective trailing fingers are normally spring biased in a counterclockwise sense. Each of the leading fingers of each leading set of fingers 115 is mounted upon a pinion 123 fixed on a shaft 124, the pinion 123 being in mesh with the pinion 117 of the companion finger, so that these leading fingers are normally biased by the spring assemblies in a clockwise direction. In other words, the spring assemblies function to normally tend to close the leading sets of fingers 115. In this connection, it will be noted that the leading finger of each trailing set of fingers is mounted on a pinion 125 which is fixed on a shaft 126 and engages a pinion 117. Thus, the spring assemblies 120 also normally tend to bias the trailing sets of fingers 116 into closed position.

Referring to FIGS. 15, 16 and 17, it will be noted that the positioning fingers and more particularly the shafts 118, 124 and 126 are mounted upon a hub assembly on an indexing shaft 130. This indexing shaft 130 extends upwardly through the platform 2 and is connected by a key 131 in an elongated slot 132 in the shaft to an upper hub 133 having a slot 134 in which the key 131 is engaged. Carried by the hub 133 by means of fasteners 135 are a pair of vertically spaced plates 136 and 137, these plates supporting the positioning finger shafts in a manner to enable relative pivotal movement of the positioning fingers. Suitably affixed to the upper plate 136 is the ring member 122 previously referred to and having the outstanding brackets 121 constituting abutments for the compression spring assemblies 120.

Each of the trailing finger pinion shafts 118 extends through and is journalled in the plates 136 and 137 and is pivotally retained therein by a retaining collar 138 between such plates. Each of the pinions 123 of the leading fingers of the leading sets of fingers 115 also has its shaft 124 extended downwardly through and journalled in the plates 136 and 137. A collar 139 on each pinion shaft 124 between plates 136 and 137 serves to retain these shafts. At its lower end each shaft 124 has a lever arm 140 having a cam roller 141 thereon. The cam rollers 141 are engageable with a leading set of fingers control cam 142 which is adapted to control the spring loaded closing of the leading sets of fingers. Each of the pinions 125 of the leading fingers of the respective trailing sets of fingers 116 has its shaft 126 extending through and journalled in the plates 136 and 137, and retained by a collar 143. Each shaft 126 has at its lower end a lever arm 144 having thereon a cam roller 145. This cam roller 145 engages a trailing set of fingers controlling cam 146 adapted to control the closing of the trailing sets of fingers 116 under the bias of the spring assemblies 120.

The leading set of fingers control cam 142 and the trailing set of fingers control cam 146 are joined by fasteners 147 and 148 respectively to a hub 149 which is in turn supported upon the indexing shaft 130 by a bearing sleeve 150, so that the cams 142 and 146 may move angularly relative to the indexing shaft 130 and the latter may index within the cams. Thus, it will be recognized that the indexing shaft 130 will effect angular motion of the entire fingers assembly, that is, rotation of the fingers supporting hub 133, but the relative angular disposition of the fingers of all of the sets of fingers will be controlled by the normal bias of the spring assemblies 120 tending to close all of the sets of fingers, under the control of cams 142 and 146.

*Pressure applying means*

The pressure applying means P previously generally referred to above by which juice extracting pressure is applied to the fruit halves on the grids *2d* may be best seen upon reference to FIGS. 1, 5, 13, and 18*a*. This pressure applying means includes a vertically reciprocable frame structure including a pair of horizontal beams 160 and depending from each beam 160 a pair of rods 161, 162 extended upwardly through tubular guides 163, 164 respectively, in the main frame of the apparatus and adapted to be reciprocated, by means which will hereinafter be described, in timed relation to the positioning of cut fruit halves on the grids and the opening of the positioning fingers.

Supported by each horizontal beam are air spring assemblies 165 having a rod 166 extending downwardly through the beam 160 and connected by a flexible joint 167, guided or stabilized by rod 168, to the upper end of a pressure head shaft 169. Each of these shafts 169 extends through a stationary, horizontal beam 170 included in the main framework, one of which underlies each vertically reciprocable beam 160. Below the stationary beam 170 the shafts 169 each support a rotary pressure head **169*a*** which may be specifically constructed in accordance with the disclosure of the copending application for United States Patent, Ser. No. 543,660.

Above the stationary beams 170 of the head shafts 169 is provided with a sprocket 171 and a drive chain 172 interconnects these sprockets, while a pair of second drive chains 173 are connected to one of the head shafts and engaged by a sprocket 174 driven by a drive shaft 175 extending upwardly through the stationary beam 170 and driven by power means which will be hereinafter described. A slidable drive connection between each of sprockets 171 and head shafts 169 is provided by a key and keyway at 176 (FIG. 5), and the details of such a connection are shown in the aforementioned U.S. Patent No. 3,250,210.

Thus, it is apparent that the pressure applying means at each side of the machine is so constructed that it may be periodically elevated to an upper position with the pressure heads spaced from the grids and lowered to a pressure applying position, as the heads **169*a*** rotate.

Associated with the pressure applying means is shielding means adapted to be disposed about the pressure heads **169*a*** as the juice is being expressed from fruit halves beneath the pressure heads so as to prevent the juice from being squirted outwardly. This is to say, the shielding means assists in maintaining all of the juice beneath the pressure heads so that it will be forced through the grid openings. Such shielding means includes, as is best seen in FIGS. 1, 5, 13, and 18*a*, annular shields 180 respectively disposable about one of the pressure heads **169*a* and mounted on a vertically reciprocable frame including a horizontal connecting member 181 (FIG. 13) and a pair of vertical rods 182 which extend upwardly through the stationary beam 170 of the frame structure. These rods 182 are interconnected at their upper ends to levers 183 projecting from a torsion bar assembly including a rockable outer torque tube 184 supported at its opposite ends in support members 185 mounted on the stationary beam 170 and in the usual manner having a torsion bar therein adapted to normally bias the levers in a direction to move the shields downwardly. In order to hold the shields up, the torque tube is provided with another outstanding lever 186 to which is connected an actuating rod 187 which extends downwardly through a tubular member 188 disposed between the platform 2 and the stationary beam 170**, and which is vertically controlled by means which will be hereinafter described.

*Power means*

As previously indicated, means are provided for effecting the timed movements of the fruit transferring, cutting, positioning, and pressure applying means, and upon reference to FIGS. 13, 14, and 15, it will be noted that beneath the platform 2 there is mounted a source of motive power in the form of an electric motor M mounted on brackets 190 which are connected to horizontal frame members 191 and having its output shaft 192 provided with a double sprocket adapted to engage a double main drive chain 193 as well as another sprocket adapted to drive another drive chain 194. The latter chain drives one of the head drive shafts 175 which extend upwardly through the platform 2 and which at its lower end is provided with a sprocket connected by a drive chain 195 to a similar sprocket carried by the other head driving shaft 175 at the other side of the apparatus.

The double drive chain 193 extends about drive sprockets respectively mounted on driving shafts of a pair of gear boxes 196 (FIG. 15) which are disposed beneath opposite sides of the machine and which are adapted to effect drive of a pair of similar main shafts 200 and 201. These main shafts are suitably journalled by bearings 202 in vertical frame members 203 which are seen in FIG. 13 as extending between a lower horizontal frame structure beneath the platform 2. A drive sprocket is provided on the left hand main drive shaft 201 as shown in FIG. 15 for driving a chain 204 which leads to an input sprocket of a gear box 204*a* by which the indexing mechanism will be operated to effect intermittent indexing of the shaft 130 and the positioning means described above.

Referring to FIG. 13, it will be seen that the main shaft 200 at this side of the apparatus has thereon: a slicer cam 205 adapted to operate the cutting means C referred to above; a pair of spaced main cams 206 adapted to effect vertical reciprocation of the pressure applying means P; a positioning finger cam 207 adapted to effect opening and closing of the positioning fingers; and a splash ring cam 208 adapted to effect vertical reciprocation of the shield means, all cyclically responsive to rotation of this main shaft. The main shaft 201 at the other side of the machine, it will be understood, will include a series of cams corresponding to the main cams 206 and the splash ring cam 208 just referred to, but such other main shaft is not provided with cams corresponding to the fruit slicer cam or the positioning finger operating cam since these operations may be performed by the single cams on the main shaft shown in FIG. 13.

The slicer cam 205 on the main shaft 200, as best seen in FIGS. 13, and 14, is provided with a cam track 209 in which is rideable a cam follower 210. This follower is connected intermediate the ends of a lever 211 which is pivoted at one end on a shaft 212 suported by a bracket 213 mounted on the base frame, and at its other end the lever 211 is connected to the vertically reciprocable rod 74 (See FIG. 6) previously described and connected at 74*a* to the slicer operating sprocket 71 which drives chain 69 which in turn drives sprockets 68 and sprockets 72 to effect oscillation of the shafts 94 and 98 with resultant pivotal movement of the pushers 93 and 97 as previously described, whereby the fruit will be sliced or halved and delivered to the platform at positions 2*a*.

The main cams 206 are provided with cam tracks 216 in which are engaged cam follower rollers 217 carried by the respective vertically reciprocable shafts 161 and 162 which are connected to the upper beams 160 of the pressure applying means, so that upon each cycle of rotation of the respective main shafts the pressure applying means will be moved from an elevated position into a pressure applying position and then back to the elevated position.

The splash ring cam 208 is engaged by a cam roller 218 which is connected to the lower end of the vertically reciprocable rod 187, the upper end of which is connected to the lever 186 mounted on the torque tube 184 of the torsion bar assembly previously described, which operates to move the lever 186 downwardly, thereby rocking the torque tube to in turn rock downwardly the pair of levers 183 thereon to which are connected the upper ends of connecting rods 182, these connecting rods being connected at their lower ends to the splash ring or shield assembly. Thus, each revolution of the main shaft 200 and cam 208 will effect movement of the splash ring or shield means from the normally loaded down position to the upper out-of-the-way position, and then back to the upper out-of-the-way position. It will be understood that the spash ring cam 208 on the other main shaft 201 will effect the same operation of the torque tube 184 at the other side of the apparatus as ilustrated in FIG. 5.

The positioning finger operating cam 207 is provided with a cam track 219 in which is engaged a cam follower roller 220. This roller 220 is supported at one end of a lever 221 which is pivotally supported on the base frame as at 222 and extends upwardly to a location beneath the platform 2. At its upper end the lever 221 is connected as at 223 to a connecting rod 224 which at its other end is connected as at 225 to the leading set of fingers control cam 142, whereby to effect oscillation of the latter as well as oscillation of the trailing set of fingers control cam 146.

The means for indexing the positioning fingers and for effecting opening and closing of the positioning fingers responsive to the indexing motion includes in addition to the above mentioned positioning finger operating cam 207, the indexing shaft 130 which is adapted to be rotated intermittently by a novel star wheel structure generally denoted S, as seen in FIGS. 15, 19, and 20. The star wheel structure includes a driver 230 mounted on the vertical output shaft 205*a* of the gear box 204*a* which is driven by the main shaft 201, as seen in FIG. 15. The driver 230 includes an eccentrically arranged series of angularly spaced pins *a*, *b*, *c*, and *d* projecting upwardly from an eccentrically mounted plate. These pins are adapted to cooperate with the star wheel which, as best seen in FIG. 19, is provided with a pair of diametrically opposite arcuate pin slots *a'*, *a'*, and another pair of diametrically opposite pin slots *d'*, *d'*. The disposition of the star wheel relative to the driver plate and the arc of travel pins *a* and *d* relative to pin slots *a'* and *d'* are such that the pins *a* and *d* will, in a manner hereinafter to be described, travel arcuately through the slots.

Intermediate the adjacent ends of each of the slots *a'* and *d'* the star wheel is provided with radial recesses having a leading side wall *b'* which is on a radius equal to the radius of the arcuate travel of pin *b* and a trailing side wall *c'*. Between the side walls *b'* and *c'* of each recess is a radial outward projection *e* forming with the respective side walls *b'* and *c'* slots *f* and *g* into which the pins *b* and *c* will progressively move to engage the star wheel in driving relation thereto.

It will be apparent upon reference to FIG. 19 now, that the arrangement of the pins *a* and*b* is such that when the driver and star wheel are rotating in the direction of the arrows, the pin *a* is still within the pin slot *a'* as the pin *b* is entering the slot *f* at which point rotation of the star wheel will be imparted from the driver. Such rotation will continue as the pin *c* moves into the slot *g* and moves the star wheel to a position at which the arcuate travel of the pin *c* brings it to the location on the side wall *c'* in slot *g* that further motion will cease, but at which time the pin *d* will have entered the pin slot *d'* so as to prevent overrunning angular movement of the star wheel relative to the driver. Such relative movement is prevented until the pin *d* leaves the pin slot *d'* at which time the pin *b* is engaged in the next successive slot *f* at a point to effect the next increment of angular motion of the star wheel. Thus, it is apparent that the positioning star wheel construction provides a positive interlock between pins *a* and *d* on the driver and at least the outer wall of slots *a'* and *d'* of the star wheel whereby stored energy in the shaft 130 cannot cause undesired motion in the intermittent drive mechanism, the release of which stored energy may cause substantial damage. It will be understood in this connection, as the description progresses, that when the star wheel is stationary and pins *a* and *d* are in slots *a'* and *d'*, the main shafts 200 and 201 are operating the pressure applying means P so that substantial energy is stored in the main shafts.

In order to prevent back rotation of the shaft 130, the driver 230 has an eccentric projection *h* recessed at *h'* to clear the star wheel S at each increment of rotation thereof, but the eccentric projection *h* will, as shown in FIG. 19, engage in arcuate depression $h''$ to prevent back rotation of the star wheel and thus the indexing shaft 130.

In any event, it will now be understood that the continuously revolving star wheel driver will effect intermittent angular motion of the indexing shaft 130 through 90° of arc. The indexing shaft, as seen in FIG. 15, extends upwardly through the platform 2 and is connected as seen in FIG. 16 to the hub of the positioning means so as to effect likewise 90° increments of rotation of the positioning finger assembly.

*Timing and operation*

The operation of the apparatus and the timing thereof will now be best understood upon reference to FIGS. 21 and 22, the former of which is illustrative of the relative contours of the cams on the respective main shafts 200 and 201 and the latter of which shows the timing of the operation of the cams.

Referring more particularly to FIG. 21, the fruit slicer cam 205 will be seen to have an eccentric section 305 and a dwell section 306. When cam follower 210 is in the dwell section 206 of the cam, the lever 211 (FIG. 14) which operates connecting rod 74 will be stationary, but as the shaft 200 revolves in the direction of the arrow, cam follower 210 will engage a section 307 of the cam track 209 which will cause downward pivotal movement of the lever 211 and corresponding downward motion of connecting rod 74 to effect counterclockwise rotation of sprocket 71 (FIG. 6). At 308 the track 209 has a short dwell section during which the downward motion is arrested. Further rotation of the slicer cam 305 will result in the reversal of the direction of motion of lever 211 and rod 74 and a resultant reversal in the direction of angular movement of sprocket 71, and then a further period of dwell when follower 210 is in track 209 in dwell section 306 of cam 205.

As a result of such a single revolution of the cam 306, the drive chain 69 will, of course, effect oscillation of both of sprockets 68 and 72 and resultant downward movement of the pushers 93 and 97 and then the return of the pushers to the upper position. Similarly, oscillation of sprocket 68 will effect rocking of lever 66 and shaft 65 so as to cause operation of the transfer means T through one cycle so as to thereby transfer a pair of fruit from the chutes 20 and 21 to the pockets defined between the opposing cups 80 and 81 in preparation for the next cycle of the slicer cam 205 which will cause the pushers 93 and 97 to push such fruit downwardly over the cutting knives to deliver cut fruit halves down guides 101 and 102 to the positions 2*a* shown in FIG. 18*b*. It will, of course, be understood at this point that as the pushers 93 and 97 move downwardly and close gates 107 and 108 at the lower ends of the guides 101 and 102, the fruit halves descending the adjacent sides of guides 101 and 102 will be precluded from entering the discharge openings 2*c* of platform 2. In this connection, it will be noted that the leading finger of the trailing sets of fingers 116 of the positioning means, as seen in FIG. 18*b*, provides an angular surface from which fruit halves of larger diameter and size descending with greater velocity may rebound toward peel discharge openings 2*c*, but the gates 107 and 108 preclude entry of such fruit halves into the openings 2*c*.

The main cams 206 on the respective main shafts 200 and 201 which effect vertical movement of the pressure applying means are angularly offset on the respective shafts 200 and 201 from the fruit slicer cam 205, and each main cam 206 includes in its cam track 216 a dwell section 310 which, through 180° of rotation of the main shaft, holds the revolving pressure applying heads 169*a* in their down position for application of pressure to fruit halves previously positioned in substantially axial alignment with the head shafts 169. It will be understood at this point that the pressure applied to the fruit halves beneath the heads will be a function of the pressure of air in the air spring cylinders 165 which, of course, may be varied as desired. In addition, each main cam 206 includes opposing heads up and heads down track sections 311 which when engaged by follower 217 will effect reciprocation of rods 161 and 162 whereby to effect vertical reciprocation of horizontal beams 160 relative to supporting beams 170 so that head shafts 169 are vertically reciprocated through their sliding drive connections with rotary drive chains 172. Each main cam track 216 is also provided with an upper dwell section 312 whereby the heads will be held in the up position for a period of time enabling the operation of the positioning fingers and indexing mechanism to move out fruit sections from positions 2*a* of FIG. 18*b* to positions 2*b* of this view of the drawings, and while the fingers assume their open positions to allow the subsequent downward movement of the heads 169*a* into revolving pressure engagement with the fruit sections in positions 2*b*. The cam dwell sections 312 are on the order of 36° in angular extent, whereby the major portion of the finger indexing motion occurs while the heads 169*a* are in motion.

Inasmuch as it is desired that the shields or splash rings 180 be in engagement with the grids 2*d* upon contact of the heads 169*a* with the cut fruit sections, the splash ring cams 208 against which cam rollers 218 are constantly urged by the torsion bar assemblies including the torque tubes 184, are each provided with a dwell section 314 in excess of 180°. In order to elevate the splash rings or shields 180 the splash ring cams 208 are each provided with a rise 315 which will engage the cam roller 218 to force rods 187 upwardly, thereby rocking levers 186 in a direction to rock levers 183 upwardly, the latter pulling rods 182 and the splash ring or shield assembly upwardly against the downward bias of the torsion bar included in the spring assembly. Each splash ring cam 208 also includes a section 316 with which the cam roller 218 is engaged to control spring loaded downward movement of the splash rings 180 as the cam rollers approach the dwell section 314 of cams 208. Intermediate cam sections 315 and 316 of each cam 208 is a dwell section 317 engageable by the cam rollers 218 to hold the splash rings 180 in the up position for a desired period.

As just indicated above, the positioning fingers are to be operated during the period that the heads 169*a* are up and the splash rings 180 are up to move fruit sections to the positions at which pressure is to be applied thereto. Accordingly, cam track 219 of positioning finger operating cam 207 is provided with a dwell section 320 which when engaged by follower 220 will, in combination with lever 221 and fingers control cams 142 and 146, allow all of the positioning fingers to remain open. In this connection, it will be noted that the follower 220 controls the position of lever 221 which, through connecting rod 224, determines the angular disposition of both the leading set of fingers control cam 142 and the trailing set of fingers control cam 146; and while follower 220 is engaged in the dwell section of positioning finger operating cam 207, the finger operating rollers 141 and 145 engageable with the respective cams 142 and 146 are respectively engaged with concentric arcuate and diametrically opposed sections 142*a* and 146*a* of the cams 142 and 146, respectively, under which circumstances all of the fingers are held open against the normal bias of the spring assemblies 120.

Intermediate each of the fingers open sections 142*a* and 146*a* of cams 142 and 146, respectively, are diametrically opposed relieved sections 142*b* and 146*b* which, upon relative angular motion of the cams 142 and 146, will allow the fingers to close and then cause the fingers to be reopened. It will be noted that the relieved sections 142*b* and 146*b* of cams 142 and 146, respectively are so angularly related to the axis of rotation of these cams that an opposing pair of leading sets of fingers operating rollers 141 engage the relieved sections 142*b* during one phase of indexing of the shaft 130 and the other opposing pair of rollers 141 will engage the relieved sections 142*b* during the next phase of indexing of the shaft 130.

Cooperative with the opposing pairs of rollers 141 and the related leading fingers of the leading sets is an opposing pair of the rollers 145 connected to the lead fingers of the trailing sets and which engage the relieved sections 146*b* of cam 146. Thus, opposing pairs of leading and trailing sets of fingers 115 and 116 diametrically related to one another above the platform 2, as seen in FIG. 18*b* for example, cooperate or work to position fruit halves upon indexing of shaft 130, and the other opposing pairs of sets of fingers 115 and 116 cooperate or work to position fruit halves in the next increment of indexing of shaft 130.

Ordinarily, therefore, upon indexing of the shaft 130 the opposing pairs of the leading and trailing sets of fingers would alternately be allowed to close and caused to open during each indexing motion as the fingers supporting plates 136 and 137 driven by hub 133 on shaft 130 revolves about the cams 142 and 146. However, it is the purpose of the positioning finger operating cam to modify such alternate closing and opening of the opposing pairs of leading and trailing sets of fingers so that the leading set of fingers of each of the opposing pairs of working fingers will be initially closed partially in advance of normal closure of both sets of fingers in each opposing pair. In order to accomplish this function, the operating cam 207 through lever 221 shifts cams 142 and 146 relative to the indexing shaft 130 preliminary to commencement of the indexing motion and during the initial stages of the indexing motion. Thus, while the normal direction of the indexing motion of shaft 130 and, therefore, the revolution of the rollers 141 and 145 of the leading fingers of the leading and trailing sets of fingers is in a counterclockwise direction, as seen in FIG. 21, the positioning finger operating cam 207 through lever 221 is provided in its cam track 219 with a section 320 adapted to effect slight clockwise rotation of the control cams 142 and 146 while the indexing shaft 130 is stationary. Such slight clockwise rotation of cam 142 will cause an opposing pair of the rollers 141 to preliminarily engage a relieved section 142*c* included in the relieved section 142*b* at each side of cam 142, allowing the pair of leading fingers of each leading set of fingers 115 in the opposed pairs of working fingers straddling the leading fruit halves shown at positions 2*a* in FIG. 18*b*, to be preliminarily slightly closed to the position shown in broken lines in this view of the drawings. Such preliminary closure of the leading sets of fingers will cause one or both of the fingers to engage the fruit half in the event that it is located inwardly with respect to the arcuate baffle 106 so as to initiate movement of the fruit half, in order that subsequent indexing motion will be better able to cause through centrifugal force, outward movement of the leading fruit halves to positions for engagement between the angular ends of the leading fingers 115. During this initial angular motion of control cam 142, before indexing commences, it will be noted that the related pair of rollers 145 will not reach the relieved sections 146*b* of cam 146 inasmuch as there is an arcuate section 146*c* of each cam section 146*a* of an angular extent approximately equalling the angular extent of relative travel of the rollers 141 and the cam section 142*c* of cam 142. Thus, only the leading set of fingers of each working pair is initially partially closed in the illustrative embodiment.

The angular motion of the cams 142 and 146 is stopped as follower 220 engages a subsequent dwell section 321 of cam track 219 in cam 207. As this point in time the indexing shaft is moved via the star wheel S through one increment of motion in the counterclockwise direction, as noted above, causing revolution of the rollers 141 and 145 about the respective cams 142 and 146 so that closing motion of the opposing pairs of trailing sets of fingers is commenced, as roller 220 engaged in cam track 219 of the finger operating cam 207 engages a cam track section 322 which will rock lever 221 in a counterclockwise direction, causing counterclockwise rotation of cams 142 and 146 along with the rollers 141 and 145, for a period during which the fruit halves will be forced angularly in the initial stages of their travel towards the grids and during which, therefore, centrifugal force will assist in assuring that the fruit halves are moved to the arcuate line substantially intersecting the axes of the pressure heads 169*a* prior to full closure of the fingers 115 and 116 into gripping engagement therewith. Next, follower 220 engages a dwell section 323 of cam track 219 in finger operating cam 207 and the fingers at this point have been fully closed upon the fruit halves.

Following dwell section 323 of cam track 219, the follower 220 will engage a cam track section 324 opposing the cam track section 322 described above so that the lever 221 will be moved in a clockwise direction as the finger operating cam 207 progresses towards the position at which the follower 220 is engaged in the dwell section 320. Such clockwise movement of the lever 221 results in clockwise angular movement of finger control cams 142 and 146 back to the position shown in FIG. 21 at which all of the fingers will be opened and indexing of the shaft 130 through 90° of rotation will have brought the cam rollers 141 and 145 of the next successive opposing pairs of positioning fingers 115 and 116 into positions for successively engaging and moving fruit halves from positions 2*a* to positions 2*b* above the grids for the application of pressure to these fruit halves during the next cycle of operation of the pressure applying means P.

Referring to FIG. 22, there is shown a diagram of the cam curves correlated to the timing of the machine whereby the above described functions occur in the desired sequence. The 0° position of the curve corresponds to the cam positions illustrated in FIG. 21. This is to say that the main shafts 200 and 201 are respectively in the 0° position in FIG. 21 prior to revolution through 180° during which the pressure applying heads 169*a* are elevated along with the splash rings and while the heads and splash rings are elevated the positioning fingers are operated through one cycle and indexed through 90°, and while the pressure applying heads are moving downwardly the cutting means C is operated so as to bisect a pair of fruit and dispose on the platform approximately at positions 2*a* halves of fruit to be positioned by the positioning fingers at positions 2*b* during the succeeding revolution of the main shafts 200 and 201.

Thus, it is seen that the angular disposition of the cams 205, 206, 207 and 208 on main shafts 200 and 201 and the angular position of the indexing shaft 130 which carries the positioning fingers through their 90° increments of movement, as well as the relative angular disposition of the fingers control cams 142 and 146, are initially established so that the sequential operation of the apparatus will be, as illustrated in FIG. 22, as follows:

From the 0° location of shafts 200 and 201, revolution of the shafts through 180° will effect raising of the heads 169*a* through the first 72° of rotation of the main shafts followed by 36° of dwell during which the heads are up. At the same time, cams 208 on the respective main shafts will cause elevation of the splash rings and the maintenance of the splash rings in the up position for a period of time. However, as pointed out above, it is desired that the splash rings contact the grids in advance of contact of the cut fruit sections by the pressure applying heads. Therefore, the splash rings commence their downward movement slightly in advance of the downward movement of the heads and the splash rings will engage the grids after 148° of rotation of the main shafts, at which the splash rings will be down, but downward movement of the heads to the heads down position occurs following 180° of rotation of the main shafts 200 and 201 and the heads will arrive at the down position after 180° of rotation and remain down through the succeeding 180° of dwell provided by the dwell sections 310 of the main cams 206.

During the period that the heads and splash rings have been moved upwardly, held in the up position, and then moved downwardly to the respective down positions, the following functions occur in succession:

First at 11° of rotation the fingers control cams 142 and 146 commence 15° of clockwise (CW) rotation, causing, as described above, the leading sets of fingers to start to partially close. At 26° the leading sets of fingers will be in their partially closed positions and all of the fingers of the opposing pairs of sets of fingers will thereafter begin to close completely as indexing of shaft 130 begins and the fingers control cams 142 and 146 stop for a period of 19° of rotation of the main shafts and as indexing movement of the shaft 130, as described above, allows the opposing pairs of working fingers to move to the closed positions. In this connection, it will be noted that the fingers control cam 142 is so contoured that the leading sets of fingers close slightly in advance of closure of the trailing sets of fingers, the latter being controlled by the fingers control cam 146. It will also be noted that at 45° of main shaft rotation the fingers control cams 142 and 146 begin 45° of counterclockwise motion (CCW) under the influence of finger operating cam 207 so that the cams 142 and 146 essentially chase the indexing shaft 130 to allow the fingers to remain closed until the indexing motion is substantially completed. The fingers control cams 142 and 146 stop their counterclockwise motion after 90° of rotation of the main shafts 200 and 201, and during 8° of rotation, the dwell section 323 of positioning finger operating cam 207 holds the cams 142 and 146 stationary, as the final stage of indexing motion is completed at 98° of rotation of the main shafts. At this point it is desired that the working fingers be opened and, accordingly, through the next 30° of rotation of the main shafts the fingers control cams 142 and 146 are rotated 30° clockwise so that the relieved sections **142*b* and 146*b* of the fingers control cams 142 and 146 will open the previously closed pairs of sets of working fingers 115 and 116**.

Meanwhile, at 108° of rotation of the main shafts, the slicer arms 93 and 97 start down so as to engage the whole fruit supported above the knives 92 in opposing pairs of cups 80 and 81 to force the fruit downwardly and thereby deliver to the platform, approximately to positions **2*a* thereon, subsequent cut fruit halves adapted, in the next cycle of rotation of the main shafts, to be engaged by the other opposed pairs of sets of working fingers and moved to the grid positions 2*b* for the expression of juice therefrom. This motion of the slicer arms 93 and 97, which, as previously described, is caused by the fruit slicer cam 205, involves the downward movement of the slicer arms, caused by track section 307 of slicer cam 205 through 90° of rotation of the main shaft 200, a dwell of the slicer arms at the bottom of their travel, caused by cam track section 308, through 18° of rotation of the main shaft 200, and then the further rotation of the main shaft 200 through 90° which cause te slicer arms 93 and 97 to come up. Such operation of the slicer arms, it will be understood, occurs entirely during the period that the heads and splash rings are moving down and are held at the splash rings down and heads down positions during the 180° of dwell provided for in the main cams 206 and the splash ring cam 208. At the end of this 180° of dwell the main shafts are back to the 0° position indicated in FIGS. 21 and 22, and another cycle of the apparatus will commence, in which, as indicated above, the fingers 115 and 116 which were not working during the just described cycle, will become the working fingers, due to the fact that the indexing shaft 130 will have been indexed 90° during 360° of rotation of the main shafts 200 and 201**.

From the foregoing it will now be apparent that in accordance with the objectives of the invention there is provided an apparatus for handling and squeezing juice from citrus fruit, into which apparatus fruit of random sizes and shapes may be fed from a source by the feed means F, to the transfer means T which is constructed in such a fashion that it is insensitive to variation in fruit size and shape and is therefore adapted to feed individual fruit supplied thereto through the vibrating feed chutes to the cutting means C, at which pairs of fruit are successively forced downwardly over the cutting knives and delivered downwardly on the guide chutes to the platform at which the incrementally indexed finger means is constructed and manipulated in such a fashion as to assure that the cut fruit halves will be positioned on the grids in substantial axial alignment with the continuously revolving pressure heads as a result of indexing movement of the positioning finger means. Moreover, the magnitude of the pressure applied to the cut fruit halves during rotation thereof by the heads is established by the air springs and the period of pressure application is precisely the same in respect of each successive fruit half. Therefore, succeeding samples of fruit representative of a load of fruit will be uniformly handled and treated to remove the juice therefrom in a standard manner, that is, without variation as to applied fruit juice expressing pressure, except for the difference caused by the fruit itself, and without variation of the period of pressure application, as well as without variation in the relative location of succeeding fruit halves beneath the revolving pressure heads.

We claim:

1. In citrus fruit juicing apparatus comprising: means for cutting fruit into sections; means for supplying fruit in succession to said cutting means; and means for expressing juice from fruit sections following operation of said cutting means; the improvement wherein said fruit supplying means includes a chute; feed means for feeding fruit to said chute; and transfer means for individually transferring single fruit from said chute to said cutting means in succession; said transfer means including a fruit receiver; means mounting said receiver adjacent the discharge end of said chute for upward and downward movement between a fruit receiving position and a fruit discharging position; and operating means for cyclically moving said receiver between said positions; said receiver including a fruit receiving ledge extended transversely of the discharge end of said chute and of progressively outwardly diminishing depth for supporting a single fruit centrally of said ledge during movement of said receiver to said fruit discharging position; a shiftable gate for retaining said single fruit on said ledge; and means for shifting said gate at said discharge position to allow discharge of said fruit from said ledge.

2. Apparatus as defined in claim 1, wherein said shiftable gate is carried by said receiver.

3. Apparatus as defined in claim 1, wherein said mounting means supports said receiver with said ledge and said gate inclined away from the discharge end of said chute.

4. In citrus fruit juicing apparatus comprising: means for cutting fruit into sections; means for supplying fruit in succession to said cutting means; and means for expressing juice from fruit sections following operation of said cutting means; the improvement wherein said fruit supplying means includes a chute; feed means for feeding fruit to said chute; and transfer means for individually transferring single fruit from said chute to said cutting means in succession; said fruit supplying means including adjacent said chute another similar chute; said feed means including means for feeding fruit to both of said chutes; and said transfer means including another similar means for individually transferring single fruit from said another chute in succession, said feed means including conveyor means operable to deliver fruit in alignment from a source; and diverter means associated with said conveyor means for receiving successive fruit from said conveyor means and supplying alternate fruit to the respective chutes.

5. Apparatus as defined in claim 4 including drive means for driving said conveyor means and said diverter means in timed relation.

6. Apparatus as defined in claim 4 wherein said diverter means includes a shiftable guide member interposed between said conveyor means and said chutes and has spaced guide walls positioned upon shifting of said guide member for alternately diverting successive fruit from said conveyor means to the respective chutes.

7. Apparatus as defined in claim 4, wherein said diverter means includes a guide member interposed between said conveyor means and said chutes; means pivotally supporting said guide member; said guide member having laterally spaced guide walls forming a pair of spaced paths; and means for pivotally moving said guide member to first and second positions at which alternately said paths lead from said conveyor means to one of said chutes.

8. Apparatus as defined in claim 7, wherein said means for pivotally moving said guide member also drives said conveyor means to supply a single fruit to each path at the first and second positions.

9. In a citrus fruit juice extractor, comprising: a platform having a grid thereon and means for positioning a cut fruit half on said grid; pressure applying means movable toward and away from said grid for applying pressure to said fruit half to express juice therefrom; means for moving said pressure applying means including a drive shaft and means operable by said drive shaft and connected to said pressure applying means to apply pressure to said fruit half responsive to rotation of said drive shaft; and said means for positioning successive fruit halves on said grid including an indexing shaft and intermittently operable drive means driven by said indexing shaft for indexing said indexing shaft while said pressure applying means is moved away from said grid; said intermittently operable drive means including means coengaged when said pressure applying means in engaged with a fruit half on said grid to prevent energy stored in said indexing shaft from moving said intermittently operable drive means.

10. A citrus fruit juice extractor as defined in claim 9, wherein said intermittently operable drive means comprises a star wheel; a driver coengageable with said star wheel and driven by said indexing shaft; said star wheel and driver having coengageable driving elements for effecting incremental rotation of said star wheel in response to continuous rotation of said driver; and said means to prevent energy stored in said indexing shaft from moving said intermittently operable drive means includes coengageable pin and slot means on said driver and star wheel coengaged when said coengageable driving elements are disengaged.

11. A citrus fruit juice extractor as defined in claim 10, wherein said coengageable pin and slot means includes angularly spaced driving slots having driving walls and a pair of driving pins engageable with said driving walls to effect indexing of said indexing shaft through an increment of movement upon each rotation of said driver; and arcuate slots intermediate said driving walls and having holding walls, and a pair of angularly spaced pins alternately engageable with said holding walls in said arcuate slots when said driving pins and driving walls are disengaged.

12. Citrus fruit juice extraction apparatus, comprising: a base frame having a platform thereon; said platform having opposing grids and opposing intermediate locations; cutting means for cutting pairs of whole fruit and delivering pairs of fruit halves to said intermediate locations; positioning means including an indexing shaft disposed centrally of said grids and intermediate locations and opposing pairs of leading and trailing sets of fingers having means for opening and closing said fingers to engage fruit halves at said intermediate locations and release the same on said grids upon indexing of said shaft; pressure applying means including a pair of revolvable heads above each of said opposing grids and means for moving said heads between an upper position and a lower position engageable with fruit halves on said grids for applying juice extracting pressure to said fruit halves on said grids; said platform having spent peel discharge openings between adjacent grids and intermediate locations and said positioning means having means for wiping spent fruit peels from said grids into said discharge openings upon indexing of said indexing shaft; means shaft means having main cam means thereon for effecting movement of said pressure applying means as aforesaid; cutting means operating cam means on said main shaft means for operating said cutting means while said heads are engaged with fruit halves on said grids; cam means including an operating cam on said main shaft means for effecting control of the opening and closing of said positioning fingers during indexing of said indexing shaft while said pressure applying means is in said upper position; and intermittently operable drive means connected to said indexing shaft and driven by said main shaft means.

13. Apparatus as defined in claim 12, wherein said main shaft means includes a pair of main shafts disposed beneath said pressure applying means and each having thereon main cam means for effecting movement of the respective pressure applying means as aforesaid and including drive means for jointly driving said main shafts.

14. Apparatus as defined in claim 13, wherein drive means are provided for driving said intermittently operable indexing shaft drive means from one of said main shafts.

15. In a citrus fruit juice extractor, comprising: a platform having spaced grids and intermediate locations for receiving halves of fruit; means for delivering cut fruit halves to said intermediate locations; positioning means for engaging and moving said fruit halves from said intermediate locations to said grids; pressure applying means movable toward and away from the respective grids for applying pressure to said fruit halves on said grids to express juice therefrom; said positioning means including sets of fruit engaging elements engageable with each fruit half; means for effecting movement of said elements of the respective sets of elements toward and away from one another to grip the respective fruit half at an intermediate location and to release said fruit half on a grid; and means for moving said sets of elements in unison to position said fruit halves on the respective grids; the improvement wherein said elements comprise divergent fingers having adjacent their outer extremities angularly disposed end portions forming confronting depressions whereby to locate the fruit halves between said fingers; and one of the fingers of each of said sets having an end portion of greater outward extent than the end portion of the other fingers of said set.

16. Positioning finger means for citrus fruit juice extraction apparatus wherein cut fruit halves are engaged between positioning fingers and moved thereby onto a grid, comprising: a pair of divergent fingers; means at one of the adjacent ends of said pair of fingers for supporting said fingers for movement toward and away from one another; said fingers at their other adjacent ends being angularly disposed and forming confronting depressions to locate fruit halves engaged therebetween; and one of said fingers to said latter end having an end portion of greater outward extent than the end portion of the other finger.

17. In citrus fruit juicing apparatus comprising: means for cutting fruit into section; means for supplying fruit in succession to said cutting means; and means for expressing juice from fruit sections following operation of said cutting means; the improvement wherein said fruit supplying means includes a chute; feed means for feeding fruit to said chute; and transfer means for individually transferring single fruit from said chute to said cutting means in succession; said transfer means including a fruit receiver; mean mounting said receiver adjacent the discharge end of said chute for upward and downward movement between a fruit receiving position and a fruit discharging position; and operating means for cyclically moving said receiver between said position; and receiver including a fruit receiving ledge extending transversely of the discharge end of said chute and progressively outwardly diminishing depth for supporting a single fruit centrally of said ledge during movement of said receiver to said fruit discharging position; and means for discharging said fruit from said ledge at said discharge position.

18. In citrus fruit juicing apparatus comprising: means for cutting fruit into sections; means for supplying fruit in succession to said cutting means; and means for expressing juice from fruit sections following operation of said cutting means; the improvement wherein said fruit supplying means includes a chute; feed means for feeding fruit to said chute; and transfer means for individually transferring single fruit from said chute to said cutting means in succession; said transfer means including a fruit receiver; means mounting said receiver adjacent the discharge end of said chute for upward and downward movement between a fruit receiving position and a fruit discharging position; and operating means for cyclically moving said receiver between said positions; said receiver including a fruit receiving section having side walls; a gate shiftably supported between said side walls; means for closing said gate when said receiver is in said fruit receiving position and for opening said gate when said receiver is in said fruit discharging position; a ledge extending between said side walls; said ledge having an edge and said gate having a lower end; said edge and said end converging outwardly from the center of said ledge when said gate is closed so that said ledge will support a fruit only centrally thereon.

19. In citrus fruit juicing apparatus comprising: means for cutting fruit into sections; means for supplying fruit in succession to said cutting means; and means for expressing juice from fruit sections following operation of said cutting means; the improvement wherein said fruit supplying means includes a chute; feed means for feeding fruit to said chute; and transfer means for individually transferring single fruit from said chute to said cutting means in succession; said transfer means including a fruit receiver; means mounting said receiver adjacent the discharge end of said chute for upward and downward movement between a fruit receiving position and a fruit discharging position; and operating means for cyclically moving said receiver between said positions; said receiver including a fruit receiving section having side walls; a gate shiftably supported between said side walls; and means for closing said gate when said receiver is in said fruit receiving position and for opening said gate when said receiver is in said fruit discharging position, said means for closing and opening said gate including cam and follower means operable to respectively open and close said gate upon movement of said receiver towards and away from said discharge position.

20. In citrus fruit juicing apparatus comprising: means for cutting fruit into sections; means for supplying fruit in succession to said cutting means; and means for expressing juice from fruit sections following operation of said cutting means; the improvement wherein said fruit supplying means includes a chute; feed means for feeding fruit to said chute; and transfer means for individually transferring single fruit from said chute to said cutting means in succession; said fruit supplying means including adjacent said chute another similar chute; said feed means including means for feeding fruit to both of said chutes; and said transfer means including another similar means for individually transferring single fruit from said another chute in succession, each of said receivers including gate means for retaining a fruit in its receiver; and means for respectively opening and closing the respective gate means upon movement of said receivers towards and away from said discharge position.

21. Fruit feeding and transferring apparatus for supplying whole fruit to the cutting mechanism of a fruit juicing apparatus, comprising: feed conveyor means having in an endless path a plurality of spaced fruit pickup members adapted to travel through a source of supply at one end of said conveyor means and to discharge said fruit individually at the other end of said conveyor means; deflector means at the discharge end of said conveyor means and including walls defining a pair of paths; means for shifting said deflector means between first and second positions at which said paths alternately are aligned with the discharge end of said conveyor means; a pair of chutes adjacent said deflector means; said paths of said deflector means leading, respectively, when said deflector means is in said first and second positions, to one of said chutes from said discharge end of said conveyor means for directing successive fruit to alternate chutes; fruit transfer means at the discharge end of said chutes including a pair of receivers each having a fruit receiving ledge; means for moving said receivers relative to said chutes with a fruit supported on said ledge; gate means for retaining a fruit on the ledge of the receivers; means for opening and closing said gate means, respectively, upon movement of said receivers from a fruit receiving position adjacent said chutes to a fruit discharge position spaced from said chutes; and means for preventing the discharge of fruit from said chutes upon movement of said receivers to said discharge positions.

22. Fruit feeding and transferring apparatus for supplying whole fruit to the cutting mechanism of a fruit juicing apparatus, comprising: feed conveyor means having in an endless path a plurality of spaced fruit pickup members adapted to travel through a source of supply at one end of said conveyor means and to discharge said fruit individually at the other end of said conveyor means; deflector means at the discharge end of said conveyor means and including walls defining a pair of paths; means for shifting said deflector means between first and second positions at which said paths alternately are aligned with the discharge end of said conveyor means; a pair of chutes adjacent said deflector means; said paths of said deflector means leading, respectively, when said deflector means is in said first and second positions, to one of said chutes from said discharge end of said conveyor means for directing successive fruit to alternate chutes.

23. Apparatus as defined in claim 22, wherein said walls of said deflector means include spaced angular walls forming an angular channel and a central baffle separating said angular walls; said deflector means being pivotally supported for movement between said first and second positions and including drive means for driving said conveyor means and said deflector means in timed relation to cause pivotal movement of said deflector means between said first and second positions for reception of the successive fruit from said conveyor means pickup members.

24. In a citrus fruit juice extractor, comprising: a platform having spaced grids and intermediate locations for receiving halves of fruit; means for delivering cut fruit halves to said intermediate locations; positioning means for engaging and moving said fruit halves from said intermediate locations to said grids; pressure applying means movable toward and away from the respective grids for applying pressure to said fruit halves on said grids to express juice therefrom; said positioning means including sets of fruit engaging elements engageable with each fruit half; means for effecting movement of said elements of the respective sets of elements toward and away from one another to grip the respective fruit half at an intermediate location and to release said fruit half on a grid; and means for moving said sets of elements in unison to position said fruit halves on the respective grids; the improvement wherein said means for effecting movement of said elements toward and away from one another includes means whereby said elements are initially partially moved toward one another in advance of movement of said elements in unison.

25. A citrus fruit juice extractor as defined in claim 24, wherein said grids and intermediate locations are angularly spaced about said positioning means and said positioning means includes a pair of leading and trailing sets of elements movable angularly in unison from said intermediate locations to said grids; and said means for effecting movement of said elements towards and away from one another includes means whereby only said leading set of fingers of said pair are initially moved toward one another.

26. A citrus fruit juice extractor as defined in claim 24, wherein said grids and intermediate locations are angularly spaced about said positioning means and said positioning means includes opposing pairs of leading and trailing sets of elements movable angularly in unison from said intermediate locations to said grids; and said means for effecting movement of said elements toward and away from one another includes control means for effecting initial partial movement only of said leading sets of elements of said pairs; said control means including members coengageable with said elements; and operating means for shifting said members relative to said leading sets of elements to effect said partial movement of said leading sets of elements toward one another.

27. In a citrus juice extractor, comprising: a platform having angularly spaced grids and intermediate locations for receiving halves of fruit; means for delivering cut fruit halves to said intermediate locations; pressure applying means movable toward and away from the respective grids for applying pressure to said fruit halves on said grids to express juice therefrom; and positioning means for engaging and moving said fruit halves from said intermediate locations to said grids, the improvement wherein said positioning means includes an indexing shaft; means for intermittently indexing said shaft; said shaft having opposed pairs of sets of fingers carried thereby and movable toward and away from one another; control means including means on certain of said fingers operative to effect such movement of said fingers upon indexing of said shaft; and operating means for shifting said control means relative to said shaft to cause initial partial movement of certain of said fingers toward one another in advance of movement of all of said fingers toward one another into gripping engagement with said fruit halves.

28. In a citrus fruit juice extractor, comprising: a platform having angularly spaced grids and intermediate locations for receiving halves of fruit; means for delivering cut fruit halves to said intermediate locations; pressure applying means movable toward and away from the respective grids for applying pressure to said fruit halves on said grids to express juice therefrom; and positioning means for engaging and moving said fruit halves from said intermediate locations to said grids, the improvement wherein said positioning means includes an indexing shaft; means for intermittently indexing said shaft; said shaft having opposed pairs of sets of fingers carried thereby and movable toward and away from one another; means for effecting such movement of said fingers upon indexing of said shaft through each increment of movement including control cam means and cam followers carried by certain of the fingers of each of said sets of fingers; said control cam means having cam sections for engaging said followers to hold said fingers open and for allowing closure of said fingers and causing reopening of said fingers upon indexing movement of said shaft.

29. A citrus fruit juice extractor as defined in claim 28, wherein means are provided for normally biasing said fingers toward one another and holding said cam followers against said cam sections.

30. Citrus fruit juice extractor apparatus as defined in claim 28, wherein each of said fingers includes a pinion, the pinions of the fingers of each set of fingers being coengaged for effecting movement of said fingers toward and away from one another upon movement of either of said fingers and insluding means resiliently engaging one of said fingers of each set to move said set of fingers toward one another and the other of said fingers having said cam follower thereon, whereby said means resiliently engaging said one of said fingers maintains said cam followers resiliently biased against said cam means.

31. A citrus fruit juice extractor as defined in claim 28, including means mounting said control cam means for angular movement relative to said indexing shaft; and operating means for effecting angular movement of said control cam means in advance of indexing movement of said shaft; said control cam means including cam sections engageable with certain of said cam followers for effecting initial partial closure of certain of said sets of fingers upon said angular movement of said control cam means.

32. A citrus fruit juice extractor as defined in claim 28, including means mounting said control cam means for angular movement relative to said indexing shaft; and operating means for effecting movement of said control cam means in advance of indexing movement of said shaft; said operating means including means for moving said control cam means angularly in the direction of said indexing movement whereby said fingers remain closed during said indexing movement and for moving said control cam means opposite to said indexing movement to open said fingers when said indexing movement is completed.

33. In a citrus fruit juice extractor, comprising: a platform having spaced grids and intermediate locations for receiving halves of fruit; cutting means for delivering cut fruit halves to said intermediate locations; positioning means for engaging and moving said fruit halves from said intermediate locations to said grids; pressure applying means movable toward and away from the respective grids for applying pressure to said fruit halves on said grids to express juice therefrom; means for operating said cutting means, said positioning means, and said pressure applying means in sequence so that successive fruit halves are delivered to said intermediate locations, positioned on said grids, and subjected to juice expressing pressure; the improvement wherein said operating means includes main shaft means; main cam means on said main shaft means for operating said pressure applying means upon rotation of said main shaft means; cam means on said main shaft means for operating said cutting means while said pressure applying means is engaged with fruit on said grids; operating means for said positioning means driven by said main shaft means and including an indexing shaft; and means for effecting indexing of said indexing shaft intermittently when said pressure applying means is spaced from said grids.

34. A citrus fruit juice extractor as defined in claim 33, wherein said grids and intermediate locations are respectively diametrically opposed in angularly spaced relation about said indexing shaft and said pressure applying means includes pressure heads spaced at opposite sides of said platform above said grids; said main shaft means including a pair of main shafts and means for driving said pair of main shafts; and said main cam means includes a cam on each of said main shafts and means for effecting movement of the respective heads toward and away from said grids.

35. A citrus fruit juice extractor as defined in claim 33, wherein splash shield means are provided for engaging said grids and shielding said pressure applying means, and including splash shield cam means on said main shaft means for effecting movement of said splash shield means toward and away from said grids.

36. A citrus fruit juice extractor as defined in claim 33, wherein said grids and intermediate locations are respectively diametrically opposed in angularly spaced relation about said indexing shaft and said pressure applying means includes pressure heads spaced at opposite sides of said platform above said grids; said main shaft means including a pair of main shafts and means for driving said pair of main shafts; said main cam means includes a cam on each of said main shafts and means for effecting movement of the respective heads toward and away from said grids; and including splash shield means disposed about said pressure heads and splash shield cam means on said main shafts for effecting movement of said splash shield means between positions engaged with said grids about said heads and spaced above said grids.

37. A citrus fruit juice extractor as defined in claim 33, wherein said grids and intermediate locations are respectively diametrically opposed in angularly spaced relation about said indexing shaft and said pressure applying means includes pressure heads spaced at opposite sides of said platform above said grids; said main shaft means including a pair of main shafts and means for driving said pair of main shafts; said main cam means includes a cam on each of said main shafts and means for effecting movement of the respective heads toward and away from said grids; and including splash shield means disposed about said pressure heads and splash shield cam means on said main shafts for effecting movement of said splash shield means between positions engaged with said grids about said heads and spaced above said grids; said splash shield cam means including a cam section for causing said splash shield means to engage said grid in advance of engagement of said heads with fruit halves on said grids.

38. A citrus fruit juice extractor as defined in claim 33, wherein said grids and intermediate locations are respectively diametrically opposed in angularly spaced relation about said indexing shaft and said pressure applying means includes pressure heads spaced at opposite sides of said platform above said grids; said main shaft means including a pair of main shafts and means for driving said pair of main shafts; said main cam means including a cam on each of said main shafts and means for effecting movement of the respective heads toward and away from said grids; said positioning means including opposed pairs of sets of positioning fingers movable toward and away from one another for engaging said fruit halves in said intermediate locations and releasing said fruit on said grids respectively; and means for controlling said movement of said sets of fingers including control cam means and operating cam means for said control cam means carried by one of said main shafts and operably connected to said control cam means for shifting said control cam means relative to said sets of fingers as said indexing shaft is intermittently indexed.

39. A citrus fruit juice extractor as defined in claim 33, wherein said grids and intermediate locations are respectively diametrically opposed in angularly spaced relation about said indexing shaft and said pressure applying means includes pressure heads spaced at opposite sides of said platform above said grids; said main shaft means including a pair of main shafts and means for driving said pair of main shafts; said main cam means including a cam on each of said main shafts and means for effecting movement of the respective heads toward and away from said grids; and positioning means including opposed pairs of sets of positioning fingers movable toward and away from one another for engaging said fruit halves in said intermediate locations and releasing said fruit on said grids respectively; and means for controlling said movement of said sets of fingers including control cam means and operating cam means for said control cam means carried by one of said main shafts and operably connected to said control cam means for shifting said control cam means relative to said sets of fingers as said indexing shaft is intermittently indexed, and to shift said control cam means in advance of indexing of said indexing shaft to effect initial partial closure of the sets of fingers nearest said grids.

40. A citrus fruit juice extractor as defined in claim 33, wherein said means for effecting indexing of said indexing shaft includes means coengaged when said pressure applying means is engaged with the fruit halves on said grids to prevent energy stored in said indexing shaft from moving said intermittently operable drive means.

41. A citrus fruit juice extractor as defined in claim 33, wherein said means for effecting indexing of said indexing shaft includes intermittently operable drive means comprising a star wheel and a driver coengageable with said star wheel; said star wheel and driver having coengageable driving elements for effecting incremental rotation of said star wheel in response to continuous rotation of said driver; means driven by said indexing shaft for driving said driver; and said driver and to shift said control cam means in advance of index coengaged when said coengageable driving elements are disengaged to prevent energy stored in said indexing shaft from moving said intermittently operable drive means.

42. In a citrus fruit juice extractor, comprising: a platform having spaced grids and intermediate locations for receiving halves of fruit; cutting means for delivering cut fruit halves to said intermediate locations; positioning means for engaging and moving said fruit halves from said intermediate locations to said grids; pressure applying means movable toward and away from the respective grids for applying pressure to said fruit halves on said grids to express juice therefrom; and means for operating said cutting means, said positioning means, and said pressure applying means in sequence so that successive fruit halves are delivered to said intermediate locations, positioned on said grids, and subjected to juice expressing pressure; the improvement wherein said cutting means includes guide means having downwardly and oppositely sloping guide surfaces leading to said intermediate locations, and pusher means for pushing cut fruit halves downwardly on said guide surfaces and onto said intermediate locations; said platform having spent peel discharge openings between said grids and said intermediate locations; said positioning means including wiper means for wiping spent fruit peels from said grids and into said discharge openings; and including barrier means for preventing access of cut fruit halves to said spent peel openings as said cut fruit halves are pushed onto said intermediate locations by said pusher means.

43. A citrus fruit juice extractor as defined in claim 42, wherein said barrier means includes a gate supported for movement between a closed position adjacent said platform between said intermediate locations and said discharge openings and an upper out-of-the-way position to allow movement of said positioning fingers therebeneath; and means for moving said gates to said closed positions upon operation of said pusher means.

44. A citrus fruit juice extractor as defined in claim 43, wherein said gates are pivotally supported on said guide means; and said means for moving said gates to said closed positions includes coengageable parts on said gates and said pusher means.

45. In citrus fruit juicing apparatus comprising: means for cutting fruit into sections; means for supplying fruit in succession to said cutting means; and means for expressing juice from fruit sections following operation of said cutting means; the improvement wherein said fruit supplying means includes a chute; feed means for feeding fruit to said chute; and transfer means for individually transferring single fruit from said chute to said cutting means in succession; said fruit supplying means including adjacent said chute another similar chute; said feed means including means for feeding fruit to both of said chutes; and said transfer means including another similar means for individually transferring single fruit from said another chute in succession; said feed means including means for alternately supplying a fruit from a source to the respective chutes.

46. In citrus fruit juicing apparatus comprising: means for cutting fruit into sections; means for supplying fruit in succession to said cutting means; and means for expressing juice from fruit sections following operation of said cutting means; the improvement wherein said fruit supplying means includes a chute; feed means for feeding fruit to said chute; and transfer means for individually transferring single fruit from said chute to said cutting means in succession; said fruit supplying means including adjacent said chute another similar chute; said feed means including means for feeding fruit to both of said chutes; and said transfer means including another similar means for individually transferring single fruit from said another chute in succession, said chutes being disposed at a slight angle leading downwardly towards said transfer means, said chutes including means for vibrating the chutes.

References Cited

UNITED STATES PATENTS

| | | | |
|---|---|---|---|
| 765,005 | 7/1904 | Gregory | 100—215 XR |
| 2,723,618 | 11/1955 | Matthews | 100—53 |
| 2,748,693 | 6/1956 | Drain et al. | 100—98 |
| 3,185,071 | 5/1965 | Foss et al. | 100—53 |
| 3,185,072 | 5/1965 | Rickard | 100—97 XR |
| 3,250,210 | 5/1966 | Rickard et al. | 100—97 XR |

FOREIGN PATENTS

| | | |
|---|---|---|
| 1,215,427 | 4/1966 | Germany. |

BILLY J. WILHITE, *Primary Examiner.*

U.S. Cl. X.R.

100—97, 110, 215, 218, 237, 238; 198—27, 210

PO-1050
(5/69)

UNITED STATES PATENT OFFICE
CERTIFICATE OF CORRECTION

Patent No. 3,448,682 Dated June 10, 1969

Inventor(s) Donn J. Rickard et al

It is certified that error appears in the above-identified patent and that said Letters Patent are hereby corrected as shown below:

Column 8, line 31, "cylindrical" should read --cyclical--. Column 9, line 65, "reflected" should read --deflected--. Column 12, line 16, after "170" insert --each--. Column 18, line 70, "180°" should read --108°--. Column 19, line 57, "te" should read --the--. Column 21, line 37, "in" should read --is--. Column 22, line 9, "means" first occurrence, should read --main--; line 63, "to" should read --at--. Column 23, line 4, "and" should read --said--. Column 25, line 29, before "juice" insert --fruit--. Column 27, line 62, "and" second occurrence, should read --said--. Column 28, delete line 16, and insert --and star wheel having coengageable pin and slot means--.

SIGNED AND
SEALED (SEAL)
Attest:

Edward M. Fletcher, Jr.
Attesting Officer

WILLIAM E. SCHUYLER, JR.
Commissioner of Patents